United States Patent
Yamasaki et al.

(10) Patent No.: US 7,875,385 B2
(45) Date of Patent: Jan. 25, 2011

(54) BATTERY, CHARGING APPARATUS AND ELECTRONIC DEVICE

(75) Inventors: Takayoshi Yamasaki, Tokyo (JP); Hiroaki Sato, Kanagawa (JP); Toshiaki Ueda, Saitama (JP); Tomonori Watanabe, Tokyo (JP); Yoichi Miyajima, Tokyo (JP); Masayuki Ishii, Fukushima (JP); Shoichi Shintani, Saitama (JP); Yoshihiro Sato, Fukushima (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 12/729,350

(22) Filed: Mar. 23, 2010

(65) Prior Publication Data

US 2010/0232101 A1 Sep. 16, 2010

Related U.S. Application Data

(63) Continuation of application No. 11/722,918, filed as application No. PCT/JP2005/023762 on Dec. 26, 2005, now Pat. No. 7,713,657.

(30) Foreign Application Priority Data

Dec. 28, 2004 (JP) ............... 2004-379986
Feb. 10, 2005 (JP) ............... 2005-035148

(51) Int. Cl.
*H01M 2/04* (2006.01)
(52) U.S. Cl. ............... 429/178; 429/175; 429/162; 429/185
(58) Field of Classification Search .......... 429/175, 429/178
See application file for complete search history.

(56) References Cited

U.S. PATENT DOCUMENTS

| | | | | |
|---|---|---|---|---|
| 5,208,116 A | * | 5/1993 | Joh | ............... 429/96 |
| 6,136,467 A | * | 10/2000 | Phelps et al. | ............... 429/97 |
| 6,411,503 B1 | * | 6/2002 | Kambayashi et al. | .. 361/679.41 |
| 2002/0034683 A1 | * | 3/2002 | Takeshita et al. | ........... 429/123 |
| 2005/0112415 A1 | * | 5/2005 | Takeshita et al. | ............... 429/7 |

FOREIGN PATENT DOCUMENTS

JP  4186930  *  4/1992

(Continued)

OTHER PUBLICATIONS

Search Report and Opinion from European Patent Office dated Jul. 21, 2008, for Application No. 05820165.8-1227/1835556, 4 pages.
Search Report and Opinion from Australian Patent Office dated Dec. 23, 2008, for Singapore Patent Application No. 200703705-4, 8 pages.

(Continued)

*Primary Examiner*—Melvin C Mayes
*Assistant Examiner*—Colette Nguyen
(74) *Attorney, Agent, or Firm*—Finnegan, Henderson, Farabow, Garrett & Dunner, L.L.P.

(57) ABSTRACT

In a battery including a battery cell formed in a flattened substantially parallelepiped shape and a terminal contacting section electrically connected to the battery cell, at one end in the longitudinal direction of a face of the battery opposing to the face on which the terminal contacting section is provided, a projecting portion which projects in the longitudinal direction of the face is provided. Meanwhile, another projecting portion which projects in the longitudinal direction of the face is provided at the other end. The projecting portions may have projecting lengths different from each other or may have projecting lengths and projecting thicknesses different from each other. A charging apparatus into which the battery is to be installed includes an accommodating section for the battery which in turn includes projection accommodating portions configured to individually accommodate the projecting portions.

14 Claims, 28 Drawing Sheets

FOREIGN PATENT DOCUMENTS

| | | | |
|---|---|---|---|
| JP | 4-186930 | | 7/1992 |
| JP | 05-012515 | * | 1/1993 |
| JP | 2005-12515 | | 1/1993 |
| JP | 11-3692 | | 1/1999 |
| JP | 11-003692 | * | 1/1999 |
| JP | 11-233158 | | 8/1999 |
| JP | 11-307072 | | 11/1999 |
| JP | 2000-251861 | * | 9/2000 |
| JP | 2001-76700 | | 3/2001 |
| JP | 2002-124229 | | 4/2002 |
| JP | 2003-223871 | | 8/2003 |
| JP | 2003-242947 | | 8/2003 |
| JP | 2003-317689 | * | 11/2003 |

OTHER PUBLICATIONS

Japanese Office Action issued on Nov. 10, 2009, in corresponding Japanese Patent Application No. 2004-379986.

Japanese Office Action issued on Nov. 24, 2009, in corresponding Japanese Patent Application No. 2005-035148.

* cited by examiner

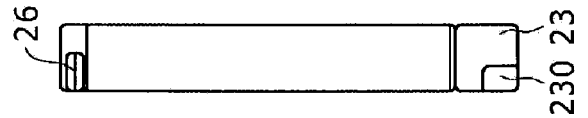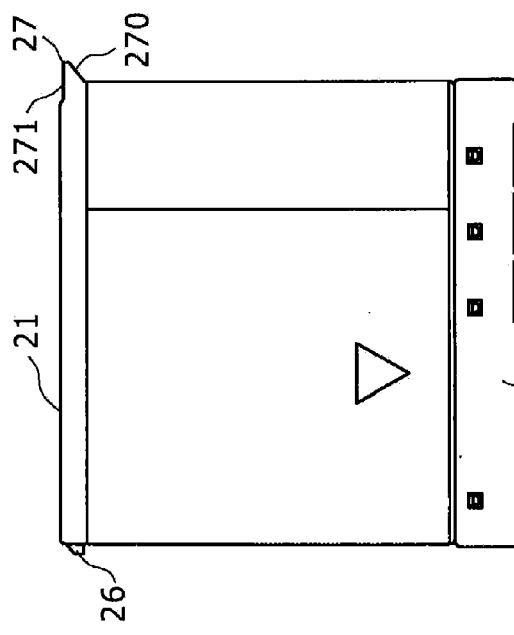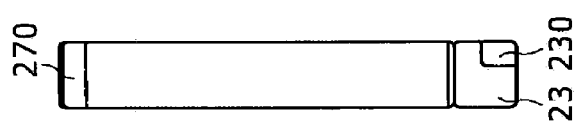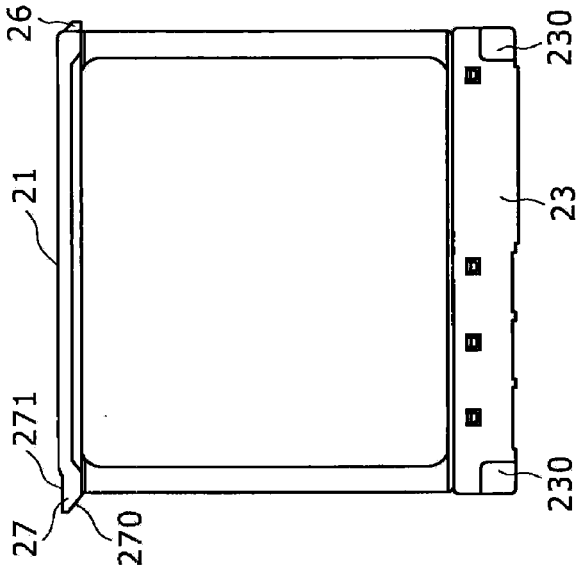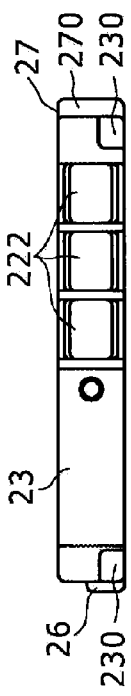

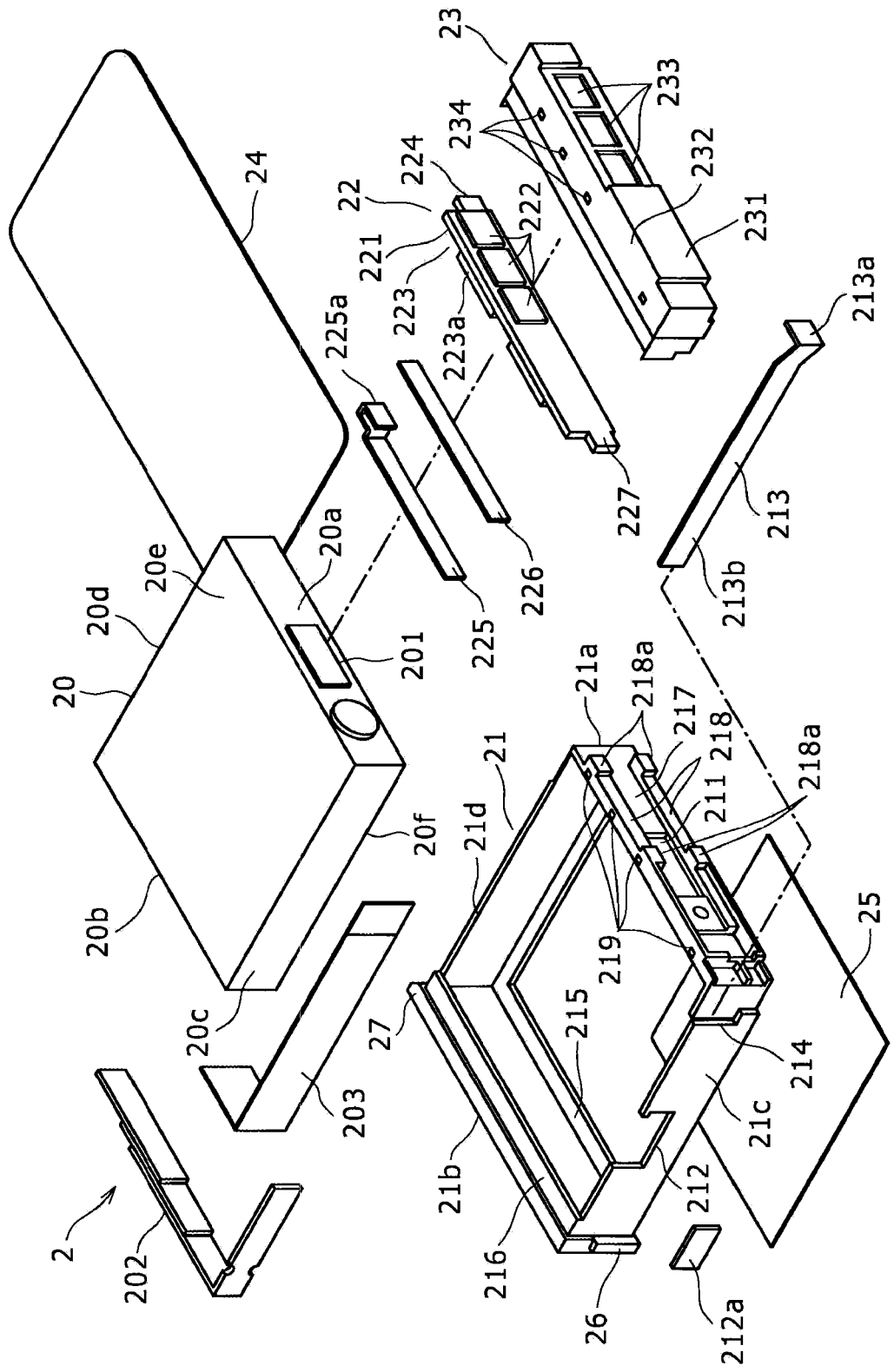

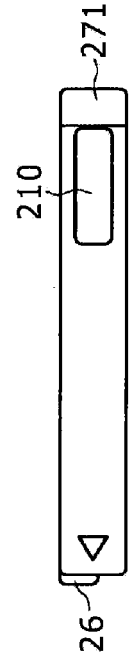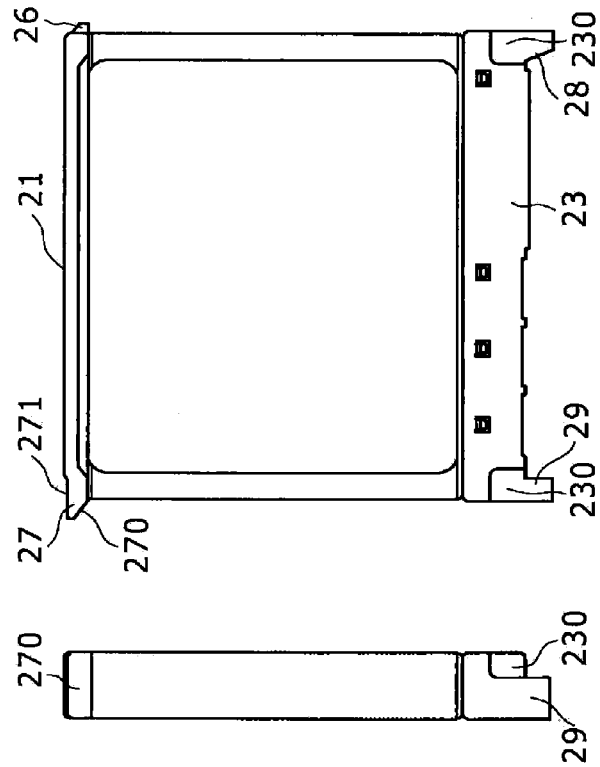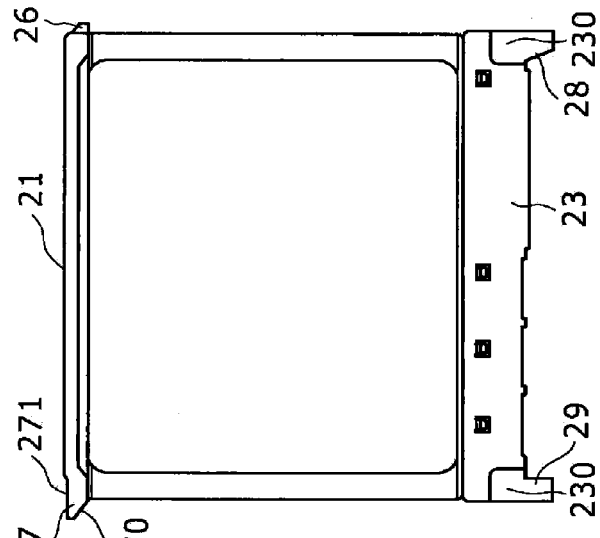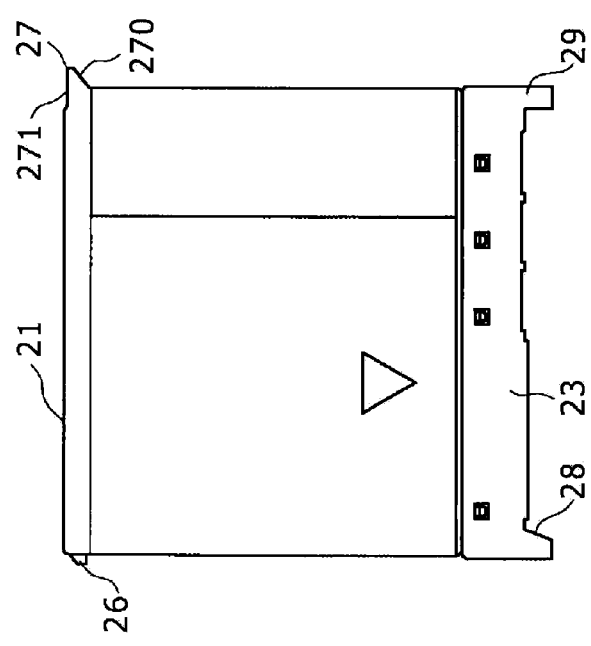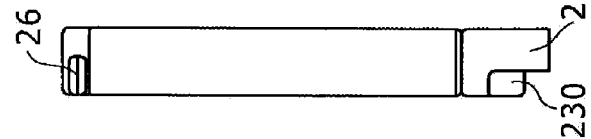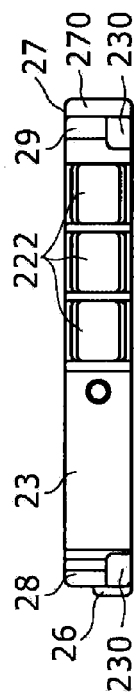

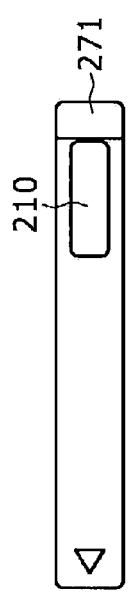
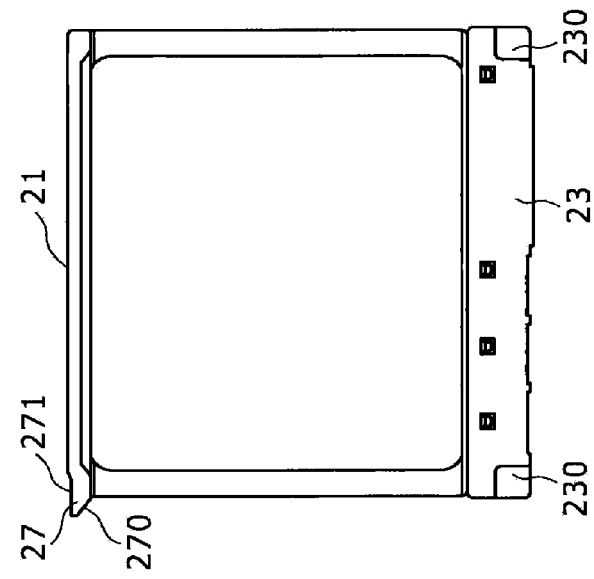
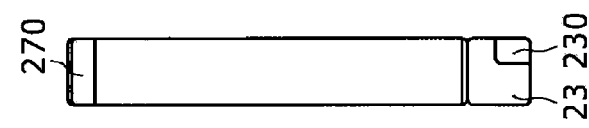
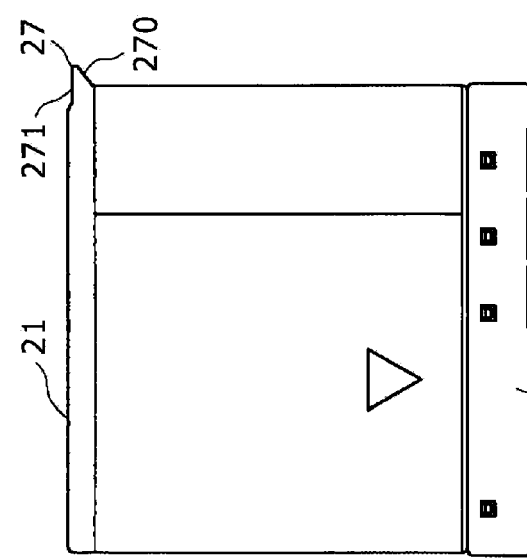
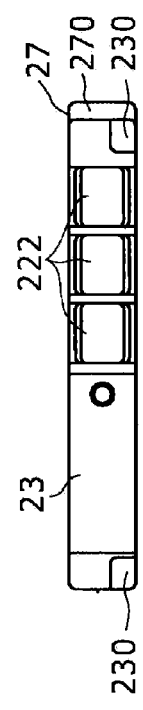
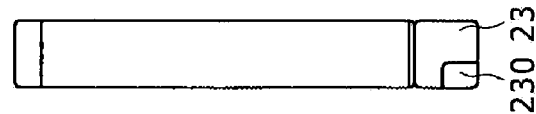

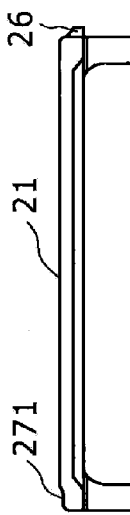
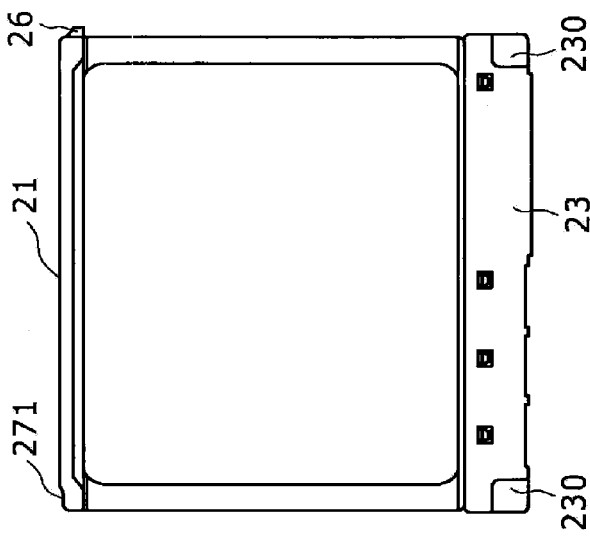
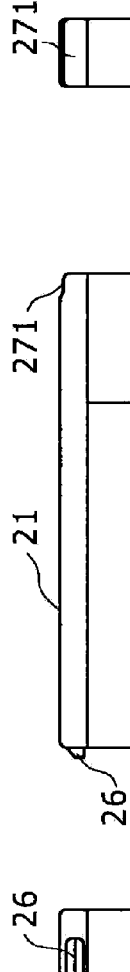
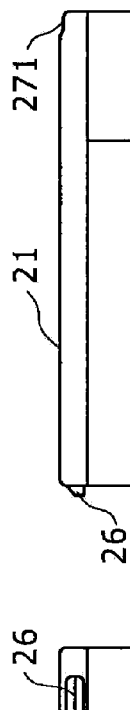
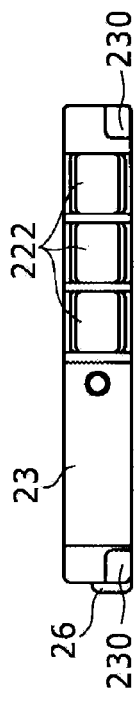

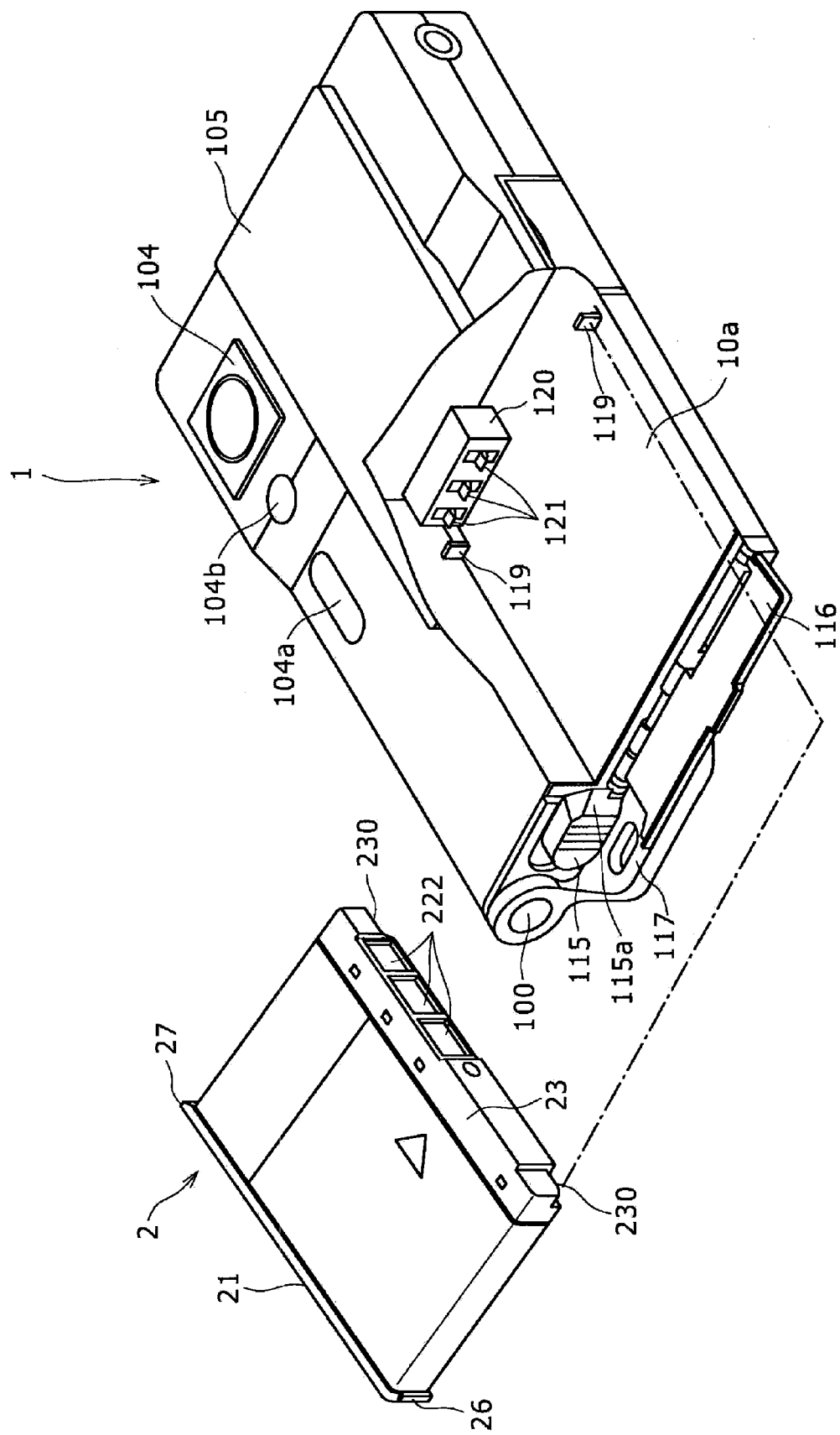

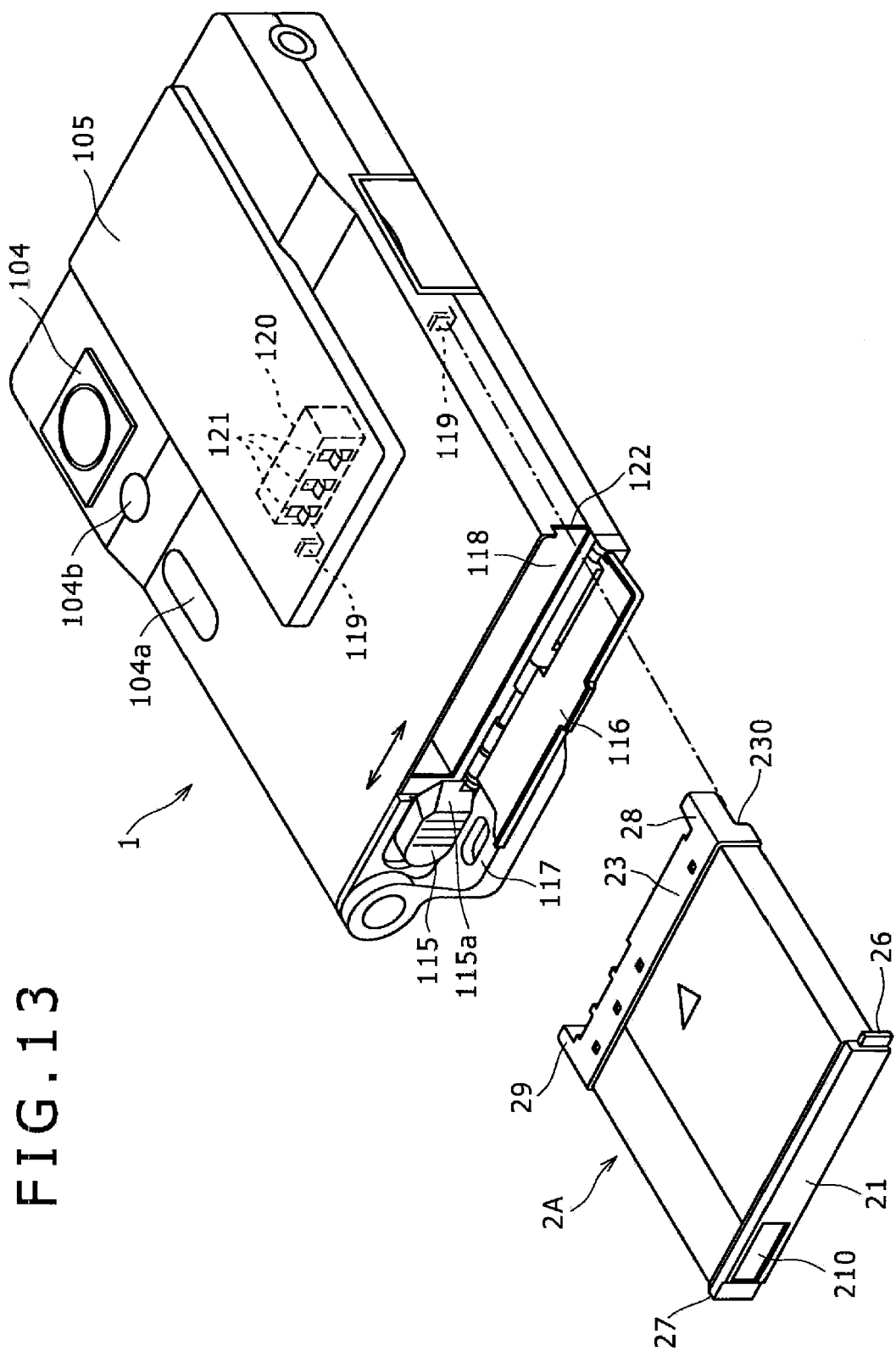

FIG.14A
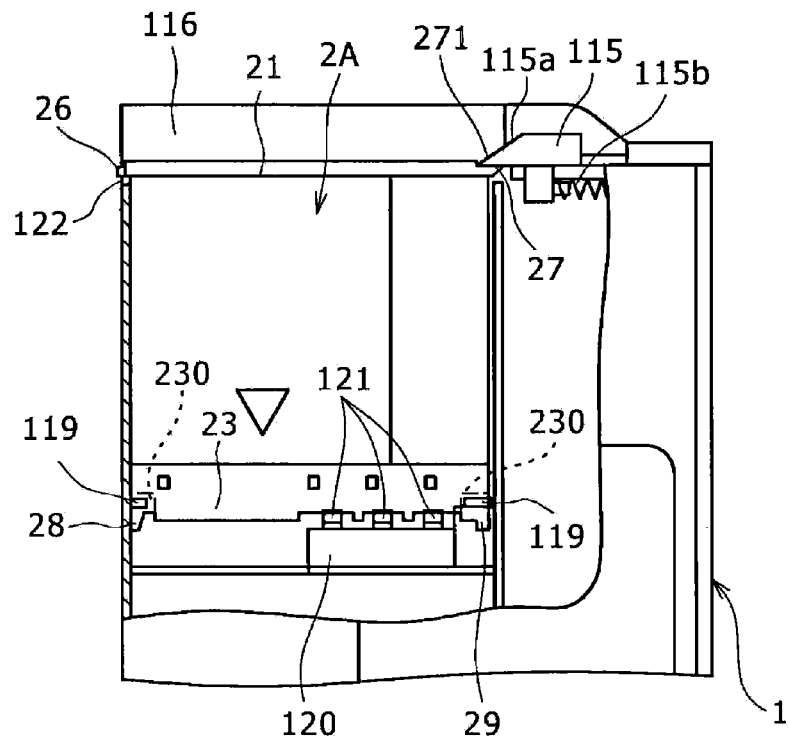
FIG.14B
FIG.14C
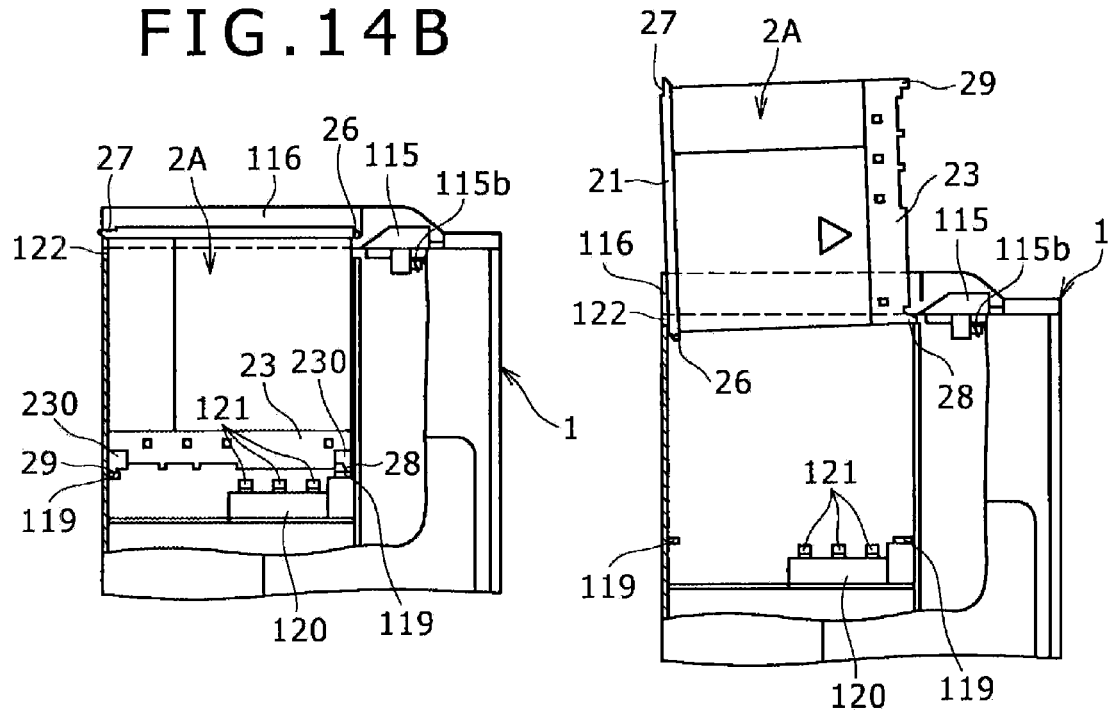

BATTERY, CHARGING APPARATUS AND ELECTRONIC DEVICE

This application is a continuation of application Ser. No. 11/722,918, filed on Dec. 12, 2007, now U.S. Pat. No. 7,713,657 which claims the benefit of priority to International Application No. PCT/JP2005/023762, filed on Dec. 26, 2005, Japanese Patent Application No. 2005-035148, filed on Feb. 10, 2005, and Japanese Patent Application No. 2004-379986, filed on Dec. 28, 2004, the entire disclosures of which are incorporated herein by reference.

TECHNICAL FIELD

This invention relates to a charging apparatus and an electronic apparatus in which a battery is installed.

BACKGROUND ART

In recent years, together with the advancement of miniaturization and reduction in weight of electronic apparatus such as image pickup apparatus represented by a digital camera and so forth, a battery installed in an electronic apparatus is formed in a parallelepiped shape advantageous for miniaturization and reduction in weight. Meanwhile, it is necessary for an electronic apparatus to which a battery is applied to be formed from a member having rigidity sufficient to withstand a bending moment in order to prevent erroneous insertion of the battery or prevent damage to an image pickup apparatus, and this makes an obstacle to miniaturization and reduction in weight.

Therefore, as shown in FIG. 28, a battery 9 disclosed in Japanese Patent Laid-Open No 2003-317689 is formed in a parallelepiped shape wherein the length of the sides in an insertion direction is set longer than the length of the sides in the widthwise direction in order to prevent erroneous insertion into an electronic apparatus while cutaway portions 91 are formed on the sides of a sheath member 90 of the battery 9 to prevent erroneous insertion with certainty and besides facilitate miniaturization and reduction in weight of the electronic apparatus into which the battery 9 is to be installed. The sheath member 90 has terminals 92 provided thereon for electrically connecting to terminals of the electronic apparatus into which the battery 9 is to be installed. The number and location of the cutaway portions 91 are determined so that an end face 93 does not have the center of symmetry. Meanwhile, a battery holder in the electronic apparatus in which the battery 9 is accommodated has an internal shape substantially same as an outer shape of the sheath member 90 and has protrusions for engaging with the cutaway portions 91 when the battery holder is accommodated. It is to be noted that, as batteries similar to the battery disclosed in Japanese Patent Laid-Open No. 2003-317689, batteries disclosed in Japanese Patent Laid-Open No. Hei 11-307072, Japanese Patent Laid-Open No. 2001-76700 and Japanese Patent Laid-Open No. Hei 11-3692 are available.

The battery 9 is charged up suitably by a charging apparatus. As the charging apparatus, a charging apparatus disclosed, for example, in Japanese Patent No. 2,508,447 is applicable. The charging apparatus mentioned includes an installation section in which the battery 9 is removably installed. The installation section has terminals provided thereon for electrically connecting to the terminals 92 of the battery 9.

DISCLOSURE OF THE INVENTION

Recently, from a demand for further miniaturization and reduction in weight of electronic apparatus, further miniaturization of a battery to be installed in the electronic apparatus is required. Thus, in order to further miniaturize the battery of the parallelepiped shape described above, it should be formed in a shape having substantially square faces opposing to each other. However, batteries available heretofore do not have any projecting portion on the side faces thereof, and on the other hand, on the apparatus side, the locking location for locking an accepted battery is not definite. Therefore, a user is puzzled with high possibility about the positional relationship between the battery and the locking location for the battery, resulting in erroneous installation of the battery into an apparatus into which the battery is to be installed, that is, an electronic apparatus and a charging apparatus.

On the other hand, if a battery having faces of a substantially square shape is formed, then where terminal contacts of the battery and the image pickup apparatus have an off-centered relationship, if the battery is in a state wherein it is inserted in vertically inverted orientation or in erroneous horizontal orientation, the terminals of the battery do not contact with the terminals of the electronic apparatus or the charging apparatus and no electric connection is established therebetween. However, since the battery housing contacts with the terminals of the electronic apparatus or the charging apparatus, there is the possibility that the terminals of the electronic apparatus or the charging apparatus may be damaged.

The present invention has been made in view of such circumstances as described above, and the object of the present invention resides in provision of a battery whose erroneous installation into an electronic apparatus or a charging apparatus, which arises from miniaturization of a battery for an electronic apparatus, can be prevented and a charging apparatus and an electronic apparatus into which the battery is to be installed.

Thus, a battery of the present invention is a battery including a battery cell formed in a flattened substantially parallelepiped shape and a connection terminal section electrically connected to the battery cell, wherein, at one end in the longitudinal direction of a face of the battery opposing to the face on which the connection terminal section is provided, a projecting portion which projects in the longitudinal direction of the face is provided.

Another battery of the present invention is a battery including a battery cell formed in a flattened substantially parallelepiped shape and a connection terminal section electrically connected to the battery cell, wherein, at each of the opposite ends in the longitudinal direction of a face of the battery opposing to the face on which the connection terminal section is provided, a projecting portion which projects in the longitudinal direction of the face is provided.

The batteries may be configured such that the face of the battery on which the connecting terminal section is formed so as to include a frame section configured to accommodate the battery cell, a terminal connection section electrically connected to the battery cell, and a cap section attached to one end side of the frame section through a circuit board section and configured to expose the terminal connection section.

With the batteries of the present invention described above, the insertion direction of the battery into which an electronic apparatus or a charging apparatus into which the battery is to be installed becomes definite.

The projecting portions formed at the opposite ends in the longitudinal direction may have projecting lengths different from each other. By this, the insertion direction of the battery into which an electronic apparatus or a charging apparatus into which the battery is to be installed becomes more definite. The projecting portions formed at the opposite ends in the longitudinal direction may have projecting lengths and projecting thicknesses different from each other. Also by this, the insertion direction of the battery into which an electronic apparatus or a charging apparatus into which the battery is to be installed becomes more definite.

A charging apparatus of the present invention is a charging apparatus having an accommodating section in which a battery including a battery cell formed in a flattened substantially parallelepiped shape and a connection terminal section electrically connected to the battery cell and configured such that, at one end in the longitudinal direction of a face of the battery opposing to the face on which the connection terminal section is provided, a projecting portion which projects in the longitudinal direction of the face is provided is removably accommodated and which includes charging terminals configured to electrically contact with the terminal connection section, wherein the accommodating section includes a projection accommodating portion configured to accommodate the projecting portion formed on the battery, and the projection accommodating portion is formed as a space configured to accommodate the projecting portion based on the size of the projecting portion.

Another charging apparatus of the present invention is a charging apparatus having an accommodating section in which a battery including a battery cell formed in a flattened substantially parallelepiped shape and a connection terminal section electrically connected to the battery cell and configured such that, at each of the opposite ends in the longitudinal direction of a face of the battery opposing to the face on which the connection terminal section is provided, a projecting portion which projects in the longitudinal direction of the face is provided is removably accommodated and which includes charging terminals configured to electrically contact with the terminal connection section, wherein the accommodating section includes projection accommodating portions configured to individually accommodate the projecting portions formed on the battery, and one of the projection accommodating portions is formed by provision of a space configured to accommodate one of the projecting portions based on the size of the one projecting portion while the other projection accommodating portion is formed by provision of a space configured to accommodate the other of the projecting portions based on the size of the last-mentioned other projecting portion.

With the charging apparatus described above, the projecting portion formed on the battery can be selectively accommodated. It is to be that the charging apparatus may be configured such that a bottom face of the accommodating section has a recessed portion, and the recessed portion forms a space in which the battery is accommodated.

The charging apparatus may be configured such that the accommodating section has a space configured to accommodate the battery and another space configured to accommodate another battery having a length greater than that of the battery, and the charging terminals serve also as charging terminals for the battery of the greater length. By this, batteries having different sizes from each other can be charged with the common charging terminals.

The accommodating section may have a locking portion provided on the face opposing to the face on which the charging terminals are formed and configured to lock the battery. By this, the battery upon charging is prevented from being removed from the charging apparatus.

An electronic apparatus of the present invention is an electronic apparatus having an accommodating section in which a battery including a battery cell formed in a flattened substantially parallelepiped shape and a connection terminal section electrically connected to the battery cell and configured such that, at one end in the longitudinal direction of a face of the battery opposing to the face on which the connection terminal section is provided, a projecting portion which projects in the longitudinal direction of the face is provided is removably accommodated and which includes terminals configured to electrically contact with the terminal connection section.

Another electronic apparatus of the present invention is an electronic apparatus having an accommodating section in which a battery including a battery cell formed in a flattened substantially parallelepiped shape and a connection terminal section electrically connected to the battery cell and configured such that, at each of the opposite ends in the longitudinal direction of a face of the battery opposing to the face on which the connection terminal section is provided, a projecting portion which projects in the longitudinal direction of the face is provided is removably accommodated and which includes terminals configured to electrically contact with the terminal connection section.

With the electronic apparatus of the invention described above, the projecting portion formed on the battery can be selectively accommodated. The accommodating section may form a projection accommodating portion configured to accommodate the projecting portion formed on the battery. By this, the insertion direction of the battery into the electronic apparatus becomes definite. Further, the projection accommodating portion may be a space configured to accommodate the projecting portion based on the size of the projecting portion. By this, the insertion direction of the battery into the electronic apparatus becomes more definite.

BRIEF DESCRIPTION OF THE DRAWINGS

FIG. 1 is side elevational views showing outer faces of a battery according to an embodiment of the present invention which has projecting portions at the opposite ends thereof.

FIG. 2 is an exploded perspective view of the battery.

FIG. 3 is side elevational views showing outer faces of a battery according to another embodiment of the present invention which has projecting portions at four locations thereof.

FIG. 4 is side elevational views showing outer faces of a battery according to a further embodiment of the present invention which has a projecting portion at one end thereof.

FIG. 5 is side elevational views showing outer faces of a battery according to a still further embodiment of the present invention which has a projecting portion at another end thereof.

FIG. 7 is a perspective view showing the inside of the image pickup apparatus in which the battery is accommodated.

FIG. 13 is an explanatory view illustrating a manner in which the battery is inserted into the image pickup apparatus.

FIG. 14 is explanatory views of insertion of the battery, and wherein FIG. 14A is an explanatory view of insertion operation of the battery and FIG. 14B and FIG. 14C are explanatory views of erroneous insertion preventing operation of the battery.

BEST MODE FOR CARRYING OUT THE INVENTION

Figure 6A:
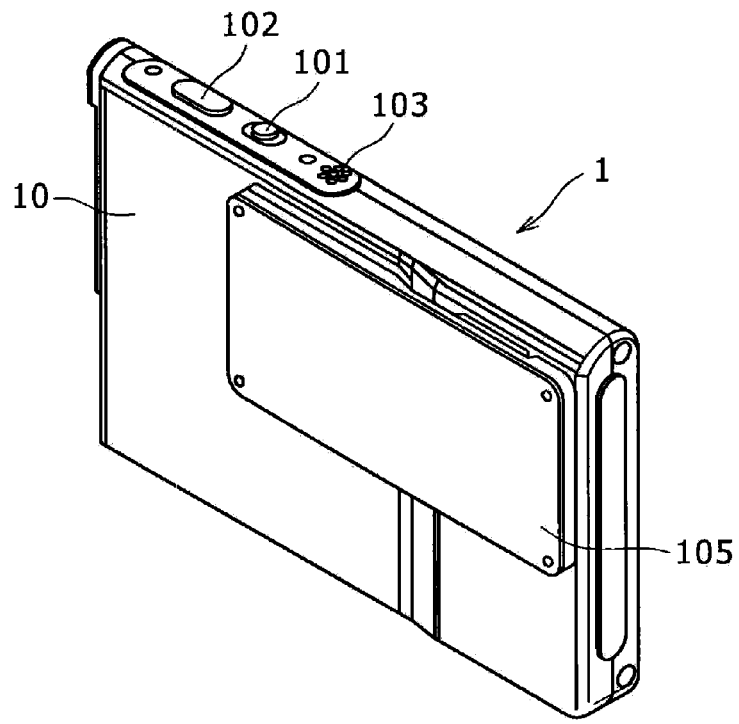
FIG. 6A is a perspective view showing an image pickup apparatus in which the battery according to the present invention is installed.

In the following, embodiments of the present invention are described with reference to the drawings.

FIG. 1A to 1F are side elevational views showing outer faces of a battery according to an embodiment of the present invention. FIG. 2 is an exploded perspective view of the battery. Further, FIG. 3A to 3F, FIG. 4A to 4F and FIG. 5A to 5F are side elevational views showing outer faces of batteries according to different embodiments of the present invention.

As shown in FIG. 2, the battery 2 includes a battery cell 20 having a substantially square principal face, a square frame member 21 in which the battery cell 20 is accommodated, a circuit board member 22 disposed on an outer side face of the frame member 21, a cap member 23 attached to one end side of the frame member 21 and the battery cell 20 in such a manner that the circuit board member 22 is sandwiched by the outer side face of the frame member 21 and the cap member 23, and a sheath film 24 integrally covering the battery cell 20 and the frame member 21.

The battery cell 20 is formed by covering a laminate (battery element), in which, for example, a positive electrode, a separator, a negative electrode and so forth are laminated in order, with a sheath member in the form of a film. As shown in FIG. 2, the battery cell 20 is formed in a flattened substantially parallelepiped shape from first to fourth side faces 20a to 20d and front and back faces 20e and 20f. A cell positive electrode member 201 is formed in a projecting fashion at a substantially central portion of the first side face 20a, and a cell negative electrode member (not shown) is formed at a central portion of the second side face 20b on the opposite side to the first side face 20a. A positive characteristic thermistor (Positive Temperature Coefficient (hereinafter referred to as PTC tab) 202 as a safety part for electric disconnection at a high temperature is connected at an end portion thereof to the cell negative electrode member while the other end portion of the PTC tab 202 extends to the third side face 20c of the battery cell 20. Insulating paper 203 is interposed between the third side face 20c of the battery cell 20 and the PTC tab 202.

The frame member 21 is formed in the shape of a quadrilateral framework from a synthetic resin material having an electric insulating property, and first to fourth sides 21a to 21d thereof overlap with outer faces of the first to fourth side faces 20a to 20d of the battery cell 20, respectively.

A cell positive electrode member fitting window 211 which fits with the cell positive electrode member 201 is provided on the first side 21a of the frame member 21 which overlaps with the first side face 20a of the battery cell 20. On the third side 21c which overlaps with the third side face 20c of the battery cell 20, a cutaway portion 212 through which an end portion of the PTC tab 202 is exposed is provided, and at an end portion on the first side 21a side, a slit 214 for introducing a negative electrode tab 213 into the inside of the third side 21c therethrough is provided. A spacer 212a is provided in the cutaway portion 212.

A flange-like protruding portion 215 is provided at a bottom portion of the frame member 21 such that it supports a bottom portion of the battery cell 20. Further, a flange-like protruding portion 216 is provided at an upper portion of the frame member 21 such that it extends along an upper edge of the second side 21b and is opposed to the flange-like protruding portion 215. An end portion of the battery cell 20 adjacent the second side face 20b is held between the flange-like protruding portions 215 and 216.

The second side 21b of the frame member 21 is formed with a height substantially equal to the height (material thickness) of the battery cell 20 accommodated in the frame member 21 when the battery cell 20 is expanded most upon charging or at a high temperature.

A circuit board attaching portion 217 is provided on an outer face of the first side 21a of the frame member 21. The circuit board attaching portion 217 is formed between a pair of upper and lower cap supporting portions 218 formed in a projecting manner at upper and lower ends of the outer face of the first side 21a of the frame member 21. A plurality of cap member locking pawls 219 are provided on the cap supporting portions 218.

The circuit board member 22 includes a plurality of terminal contacting portions 222 on the outer face side of a base plate 221 formed from an insulating synthetic resin material such as glass epoxy phenol. The circuit board member 22 further includes electronic parts and a transfer mold 223, in which the electronic parts are molded, provided on the inner face side of the base plate 221. The circuit board member 22 is assembled and secured in a state wherein it is sandwiched by and between the frame member 21 and the cap member 23 with a predetermined (small) gap left between an end of the transfer mold 223 and the frame member 21.

A positive electrode tab 225 is connected at one end portion 225a thereof to a terminal portion 224 at one end of the circuit board member 22 by welding. The positive electrode tab 225 is connected on the other end side thereof to the cell positive electrode member 201 of the battery cell 20 by welding. An insulating paper 226 is interposed between the circuit board member 22 and the positive electrode tab 225. Further, the negative electrode tab 213 is connected at the one end 213a thereof to a terminal portion 227 at the other end of the circuit board member 22 by welding.

The positive electrode tab 225 is formed in a substantially L shape from a metal plate such as a nickel plate. The metal plate can be worked so as to be bent readily as a result of so-called annealing applied thereto. The above-described substantially L-shaped positive electrode tab 225 is connected on the major side thereof to the positive electrode tab 225 and on the minor side thereof to the terminal portion 227 at an end of the circuit board member 22.

Also the negative electrode tab 213 described hereinabove is formed in a substantially L shape from a metal plate such as a nickel plate similarly to the positive electrode tab 225. The L-shaped negative electrode tab 213 is connected at the one end 213a on the minor side thereof to the terminal portion 227 at the other end of the circuit board member 22. The other end 213b on the major side of the negative electrode tab 213 is led into the inner face side of the first side 21a through the slit 214 formed in the third side 21c of the frame member 21 and is connected to the PTC tab 202.

The cap member 23 includes a rectangular end face portion 231 overlapping with the outer face of the first side 21a of the frame member 21 through the circuit board member 22 (across the circuit board member 22) attached to the circuit board attaching portion 217. The cap member 23 further includes a tubular portion 232 provided contiguously to the rectangular end face portion 231 and fitted with one end side of the frame member 21 and the battery cell 20.

A plurality of terminal windows 233 are provided on the end face portion 232 of the cap member 23 such that the terminal contacting portions 222 of the circuit board member 22 are exposed therethrough. Further, a plurality of pawl engaging holes 234 are provided on the upper and lower face of the tubular portion 232 such that the plurality of cap member locking pawls 219 provided on the pair of upper and lower cap supporting portions 218 of the frame member 21 are fitted therewith.

The frame member 21 includes a plurality of protrusions 218a provided on the pair of upper and lower cap supporting portions 218 in such a manner as to project toward the circuit board member 22 side. The protrusions 218a contact with portions of the circuit board member 22 at which electronic parts and so forth are not mounted at positions at which they sandwich the transfer mold 223 when the terminal contacting portions 222 of the circuit board member 22 are pressurized by the counterpart side terminals or the like.

The sheath film 24 is formed as a sheet of a thickness of approximately 0.05 to 0.1 mm from a synthetic resin material such as polyethylene (PE), polyethylene terephthalate (PET) or polycarbonate (PC). Then, after the battery cell 20 is accommodated into the frame member 21 and the circuit board member 22 and so forth are attached to the frame member 21 and then the cap member 23 is put on the circuit board member 22, the sheath film 24 is wrapped around the frame member 21 so as to cover the front and back faces of the battery cell 20 and integrally couple the battery cell 20, frame member 21 and cap member 23 to each other. It is to be noted that a name plate film 25 is applied to the sheath film 24.

The frame member 21 makes it possible to prevent erroneous insertion of the battery 2 into an image pickup apparatus 1 by forming, at an end edge portion of the second side 21b of the frame member 21, projecting portions 26 and 27 projecting in the lengthwise direction of the second side 21b. The projecting portions 26 and 27 are formed such that they have different shapes from each other. In particular, the projecting portions 26 and 27 are formed such that the length and the thickness of the projecting portion 26 and the length and the thickness of the projecting portion 27 are different from each other. It is to be noted that, on the frame member 21, a locked portion 210 for being locked by a locking portion 351 formed on a charging apparatus 3 hereinafter described is formed.

The projecting portion 26 is formed in a substantially parallelepiped shape as seen in FIG. 1. Meanwhile, in an accommodating section 10a of the image pickup apparatus 1 (FIGS.

7 and 8), a projection accommodating portion 122 is formed which accommodates the projecting portion 26 in an exposed state when the battery 2 is installed in the image pickup apparatus 1. The projection accommodating portion 122 is formed with a necessary but minimum size with which it can accommodate the projecting portion 26. Here, the cutaway area of the projection accommodating portion 122 is set greater than the area of the projecting portion 26 provided on the frame member 21 of the battery 2.

As shown in FIG. 1, the projecting portion 27 is formed such that it has a substantially trapezoidal cross section so as to have an inclined face 270. Further, a locked face 271 is formed on the projecting portion 27 such that it is locked by a locking pawl 115 when the battery 2 is installed in the image pickup apparatus 1 and the locking pawl 115 locks the battery 2.

The locked face 271 is set so as to have a height lower than the face of the frame member 21 to clearly indicate the location locked by the locking pawl 115. Simultaneously, the locked face 271 can deter the locking pawl 115 which is acted upon by a contact pressure of a spring. Further, the locked face 271 has a coefficient of friction lower than that of a peripheral portion. Consequently, the location to be locked is indicated more clearly. Furthermore, since the locking pawl 115 becomes liable to slip, it can be locked rapidly.

Further, as another embodiment of the battery 2, a battery 2A shown in FIG. 3A to 3F is provided. The battery 2A may be formed such that projecting portions 28 and 29 of different shapes projecting in the insertion direction are formed at the opposite end portions of the face of the cap member 23 of the battery 2 so as to prevent erroneous insertion of the battery 2A into the image pickup apparatus 1. While the projecting portion 28 is formed such that it has a substantially trapezoidal cross section, the projecting portion 29 is formed in a substantially parallelepiped shape, and the thicknesses of the two projections are different from each other. It is to be noted that the projecting portion 28 and the projecting portion 29 may be formed such that the projecting lengths thereof are different from each other.

As a further embodiment of the battery 2, a battery 2B shown in FIG. 4A to 4F is provided. The battery 2B includes the frame member 21 on which only the projecting portion 27 is provided.

As a still further embodiment of the battery 2, a battery 2C shown in FIG. 5A to 5F is provided. The battery 2C includes the frame member 21 on which only the projecting portion 26 is provided.

Figure 6B:
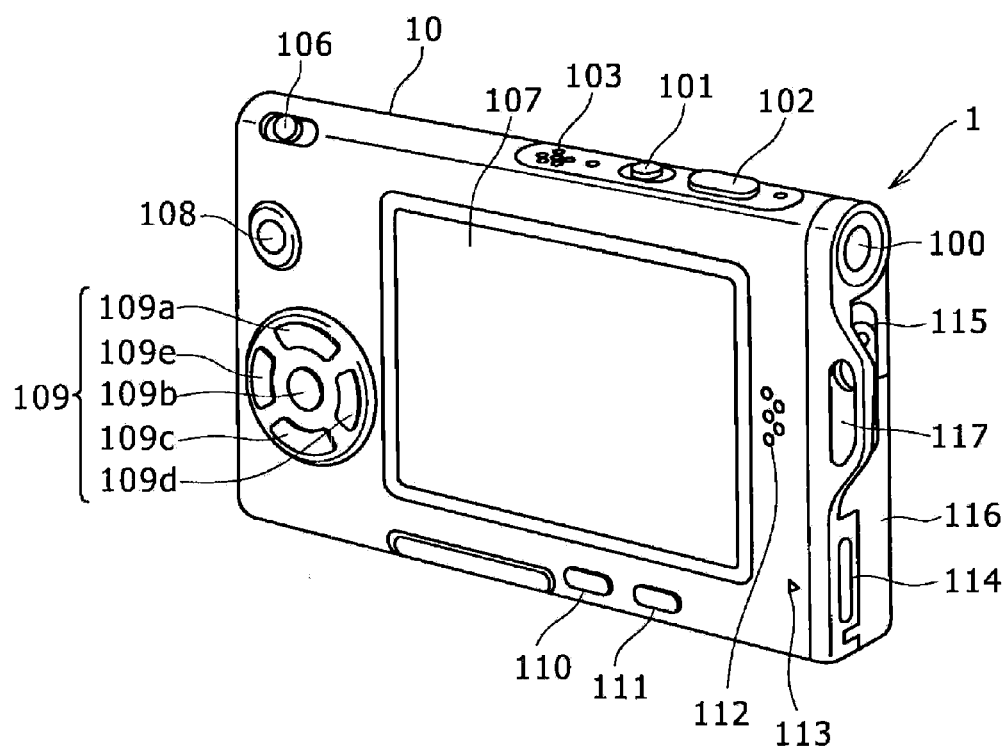
FIG. 6B is another perspective view showing the image pickup apparatus in which the battery according to the present invention is installed.
Figure 8:
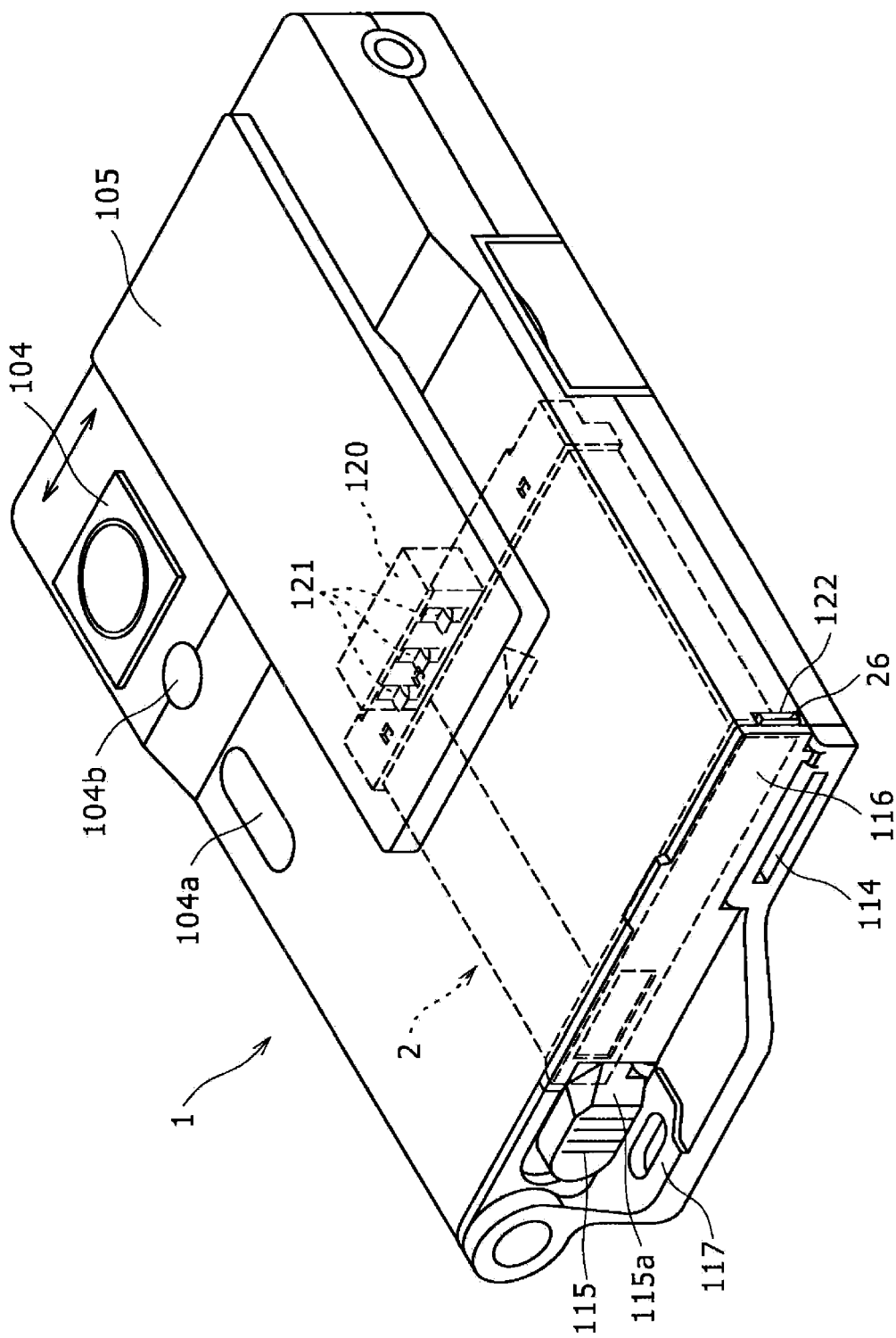
FIG. 8 is a perspective view illustrating a state wherein the battery is installed in the image pickup apparatus.
Figure 9:
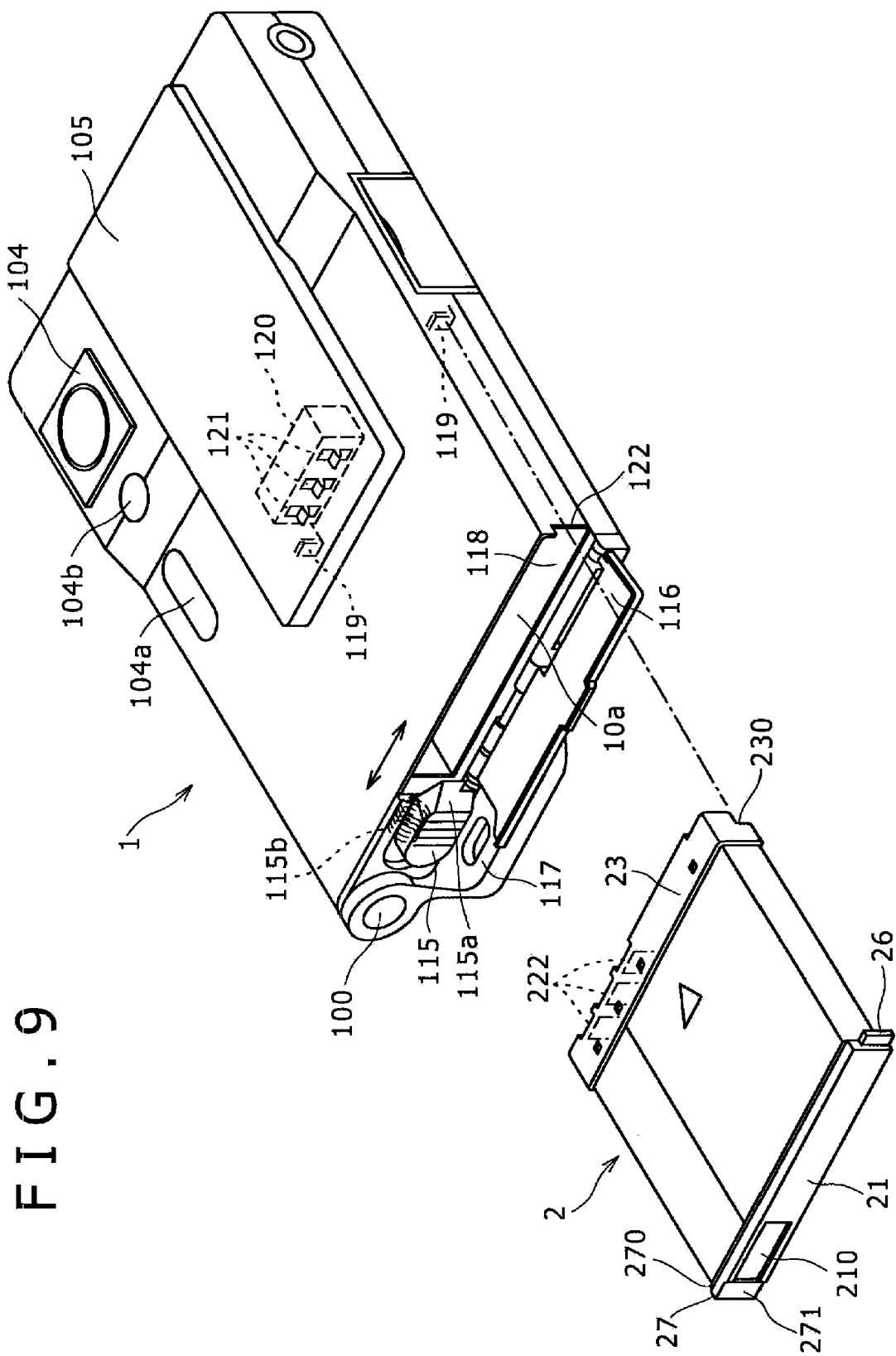
FIG. 9 is an explanatory view illustrating a manner in which the battery is inserted into the image pickup apparatus.

FIG. 6A is a perspective view of a lens cover side of an image pickup apparatus in which a battery according to the present invention is installed. FIG. 6B is a perspective view of a monitor side of the image pickup apparatus. FIG. 7 is a perspective view showing the inside of the image pickup apparatus in which the battery is accommodated. FIG. 8 is a perspective view showing a state wherein the battery is installed in the image pickup apparatus. FIG. 9 is an explanatory view showing a manner of insertion of the battery into the image pickup apparatus.

As shown in FIG. 6A, the image pickup apparatus 1 includes a zoom lever 101, a shutter button 102 and a microphone 103 on an upper face portion of a body 10. shown in FIG. 4, an image pickup lens 104, a flash device 104a, an AF illuminator 104b and a lens cover 105 are provided on a front face portion of the image pickup apparatus 1. The lens cover 105 is of the slide type and covers the image pickup lens 104, flash device 104a and AF illuminator 104b. The AF illuminator 104b emits auxiliary light for focusing at a dark place.

Meanwhile, as shown in FIG. 6B, a mode changeover switch 106, a monitor 107, a menu button 108, control buttons 109, a screen display button 110, a screen size selection/screen deletion button ill, a speaker 112 and a reset button 113 are provided on a rear face portion of the body 10. The control buttons 109 include a flash mode button 109a, a review button 109b, a self timer button 109c, a macro button 109d and a determination button 109e. The components mentioned are provided on a known digital camera apparatus (for example, the digital camera DSC-T3 by Sony).

Further, as shown in FIG. 7, the image pickup apparatus 1 has an accommodating section 10a for accommodating the battery 2. Further, as shown in FIG. 8, the image pickup apparatus 1 includes, on a side face portion of the battery insertion side, a power supply button 100, a multi terminal 114, a locking pawl 115 serving as means for locking the battery 2 when the battery 2 is inserted into and installed in the image pickup apparatus 1, a lid 116 serving as means for enclosing the battery 2 installed, a strap metal member 117 for holding the image pickup apparatus 1, an opening 118 (FIG. 9) for accepting the battery 2. It is to be noted that the strap metal member 117 acts also to facilitate holding by putting the thumb to the strap metal member 117 upon image pickup.

The accommodating section 10a includes ribs 119 and a terminal plate 120. The terminal plate 120 includes terminals 121 having spring resiliency. The ribs 119 contact with recessed portions 230 (FIG. 1) formed on the battery 2 in a state wherein the battery 2 is accommodated in the accommodating section 10a. The terminals 121 electrically connect to the terminal contacting portions 222 (FIG. 1) of the battery 2 in a state wherein the battery 2 is accommodated in the accommodating section 10a.

The locking pawl 115 is provided for movement in the directions indicate by an arrow mark in FIG. 9 and is biased in a direction toward the opening 118 by a spring 115b. The locking pawl 115 forms an inclined face 115a. The inclined face 115a is provided to make up for the discharge amount of the battery 2 by the spring elasticity of the spring 115b. In particular, when the battery 2 is discharged from the image pickup apparatus 1, the locking pawl 115 pressed by the contact pressure of the spring 115b is guided under the projecting portion 27 formed on the frame member 21 of the battery 2 by the locking pawl 115 to promote the discharge of the battery 2. It is to be noted that, since only it is necessary for the locking pawl 115 to be capable of locking the battery 2 installed in the image pickup apparatus 1, there is no necessity to form the inclined face 115a.

Figure 15:
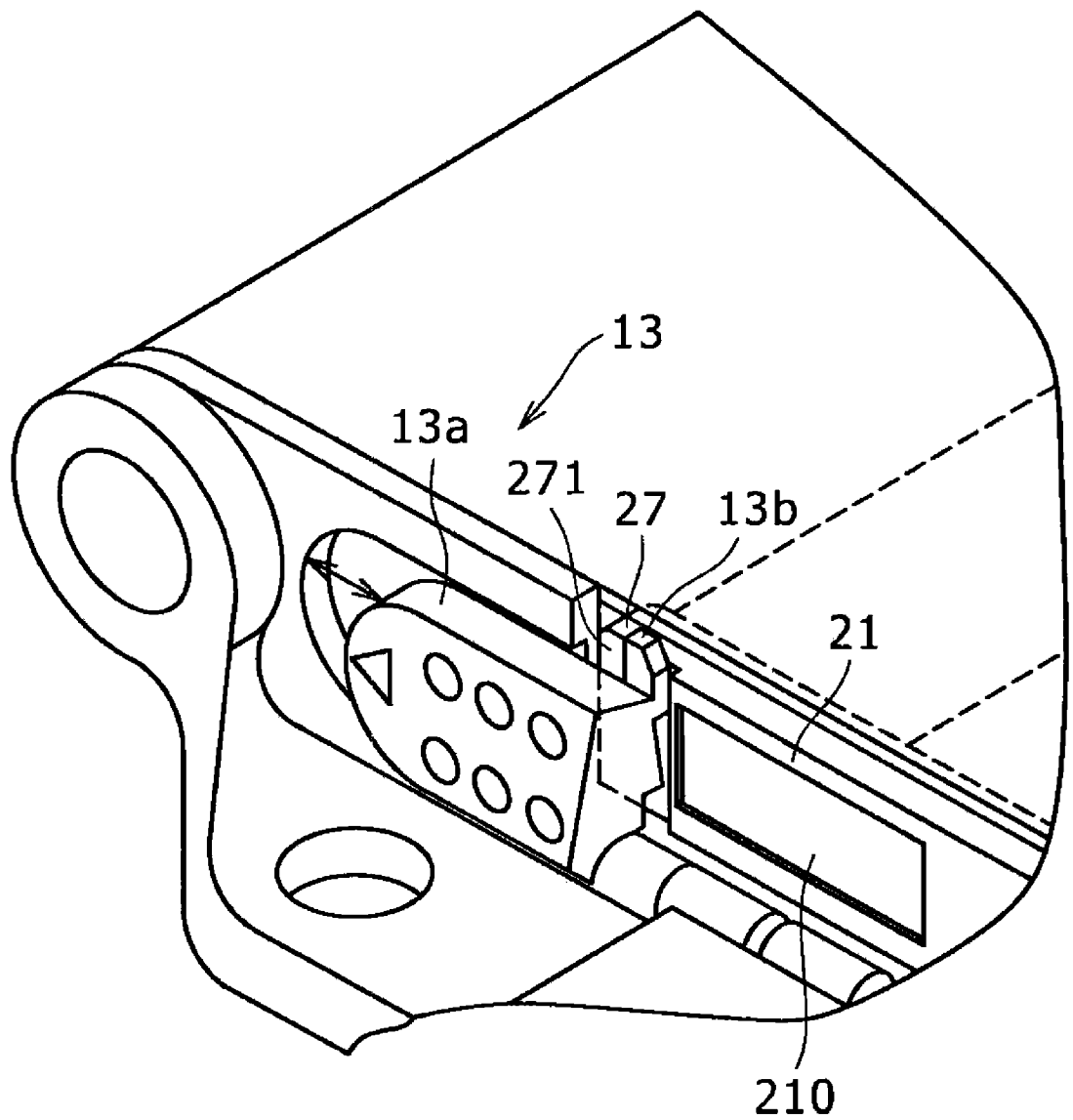
FIG. 15 is a perspective view showing a locking pawl of the image pickup apparatus.

In particular, the locking pawl 115 may be formed in such a configuration as seen in FIG. 15. A locking pawl 13 includes a locking portion 13a which can move back and forth by resilient deformation of a spring formed similarly to the spring 115b. The locking pawl 13 further includes an auxiliary locking portion 13b.

Insertion operation of the battery 2 is described with reference to FIGS. 9 to 12.

Figure 10A:
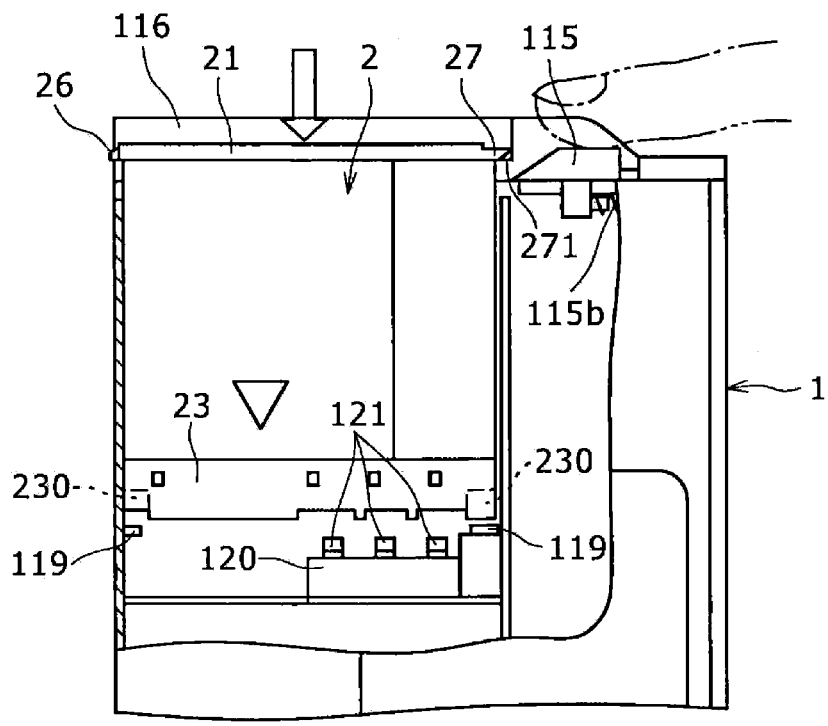
FIG. 10 is explanatory views of insertion operation of the battery.
Figures 10B, 10C:
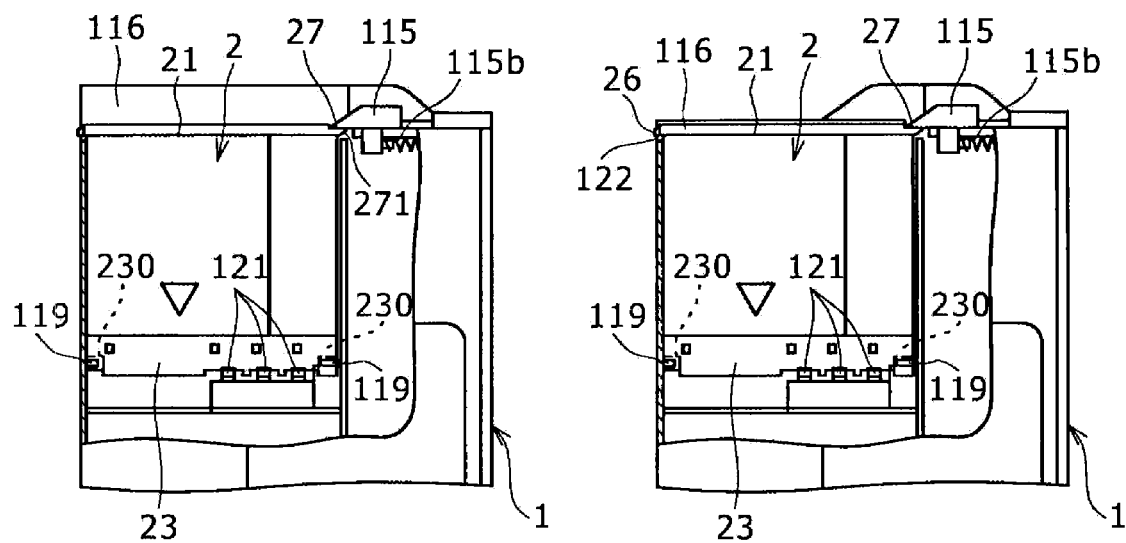

As shown in FIG. 9, the battery 2 is inserted into the image pickup apparatus 1 while the face of the battery 2 which has the terminal contacting portions 222 is directed toward the opening 118 of the image pickup apparatus 1. At this time, the battery 2 is inserted into the image pickup apparatus 1 in a state wherein the locking pawl 115 is pulled by a finger as seen in FIG. 10A. Then, if the locking pawl 115 is released from the finger to open at a point of time at which the battery 2 is accommodated fully into the image pickup apparatus 1 with the bottom portion of the recessed portions 230 thereof contacting with the ribs 119 in the image pickup apparatus 1 as seen in FIG. 10B, then the locking pawl 115 is biased by the spring 115b, which normally biases the locking pawl 115 in the direction toward an opening 11 (FIG. 9), to slidably move in the direction toward the battery 2 until the locked face 271 is locked by the locked face 271 thereby to lock the battery 2. Thereafter, the lid 116 is closed to enclose the battery 2 in the image pickup apparatus 1 as shown in FIG. 10C. At this time, the terminals 121 provided on the terminal plate 120 of the image pickup apparatus 1 are placed into a state wherein they are electrically connected to the terminal contacting portions 222 of the battery 2 in a state wherein they are compressed by resilient deformation.

Figure 11A:
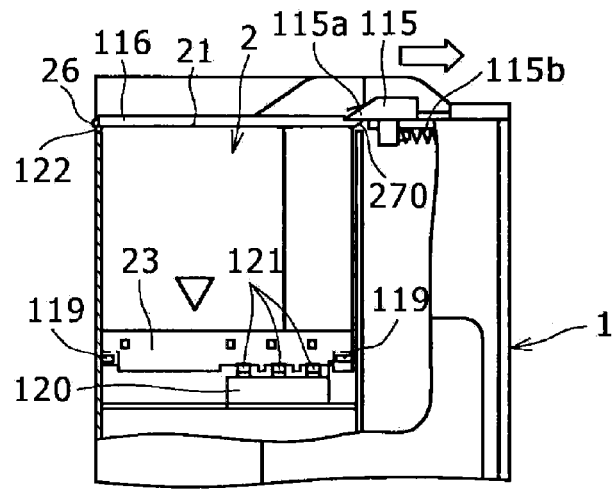
FIG. 11 is explanatory views of discharging operation of the battery.
Figure 11B:
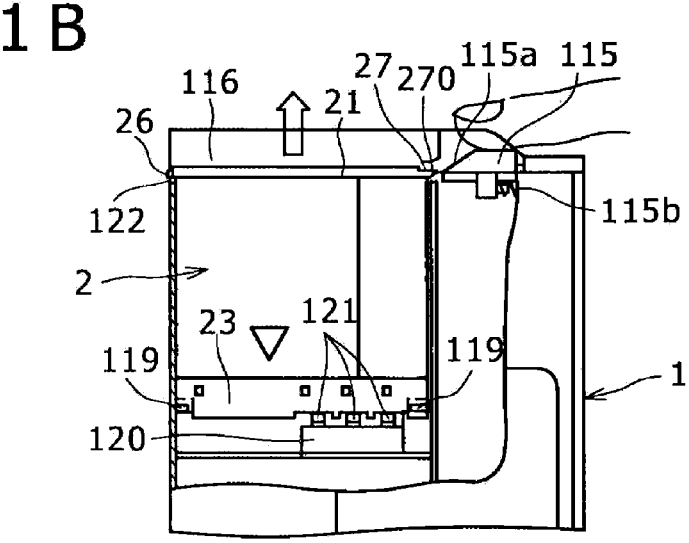
Figure 11C:
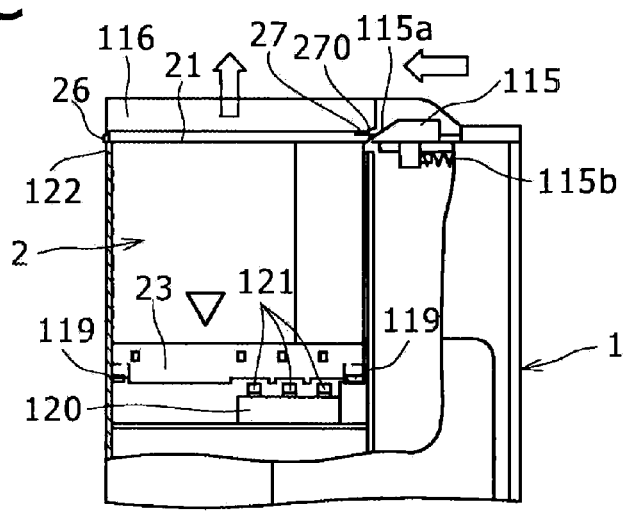

Then, when the battery 2 is to be removed, if the locking pawl 115 is pulled in the direction indicated by a horizontal arrow mark as seen in 11A, then the battery 2 projects in the direction of the arrow mark under contact pressure of the terminals 121 on the terminal plate 120 as seen in FIG. 11B. Here, if the locking pawl 115 is released from the finger, then the locking pawl 115 is biased by the spring 115b, which biases the locking pawl 115, to move in the direction toward the battery 2 as shown in FIG. 11C. At this time, since the projecting portion 26 is exposed to the outside of the image pickup apparatus 1, the battery 2 can be taken out readily by putting fingers to the projecting portions 26 and 27. It is to be noted that, where the inclined face 115a is formed on the locking pawl 115, since the locking pawl 115 advances below the projecting portion 27 while contacting the inclined face 115a thereof with the inclined face 270 of the projecting portion 27, the discharge amount of the battery 2 is made up for, and the battery 2 projects further. As a result the battery 2 can be taken out further readily.

Figure 12A:
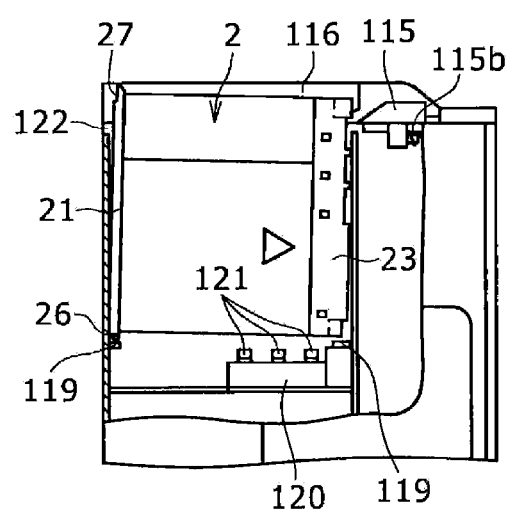
FIG. 12 is explanatory views of erroneous insertion preventing operation of the battery.
Figure 12C:
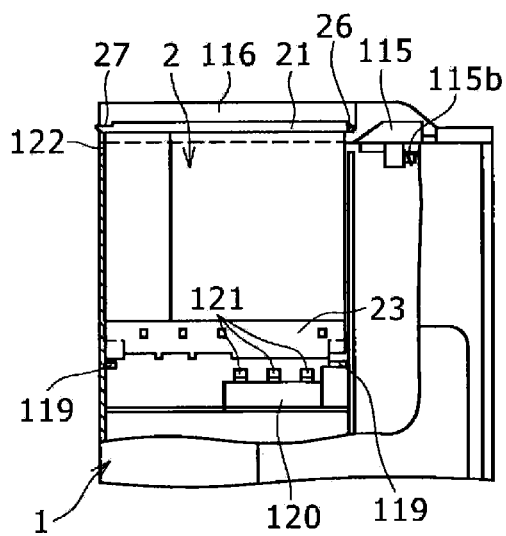
Figure 12B:
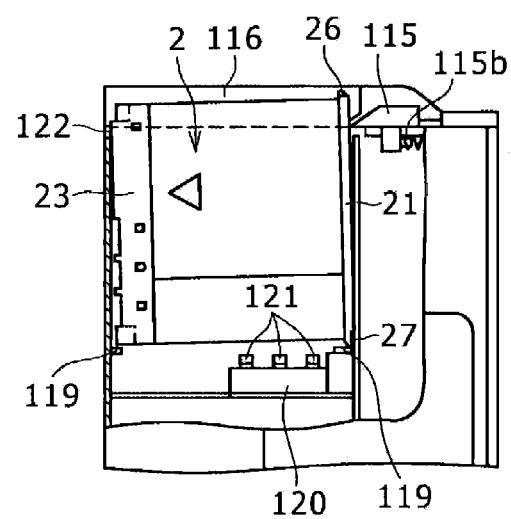

On the other hand, if the battery 2 is erroneously inserted in transverse orientation into the image pickup apparatus 1 as shown in FIG. 12A and 12B, then the projecting portion 26 of the buttery 2 touches with a rib 119 and the side face of the cap member 23 touches with another rib 119. At this time, since part of the battery 2 protrudes from the body of the image pickup apparatus 1, the locking pawl 115 cannot lock the battery 2 and the door 116 cannot close up the opening 118.

Further, if the battery 2 is inserted in a vertically inverted state into the image pickup apparatus 1 as seen in FIG. 12C, an end portion of the cap member 23 of the battery 2 abuts with the ribs 119. Also at this time, since part of the battery 2 protrudes from the body of the image pickup apparatus 1, the locking pawl 115 cannot lock the battery 2 and the lid 116 cannot close up the opening 118.

Figure 12D:
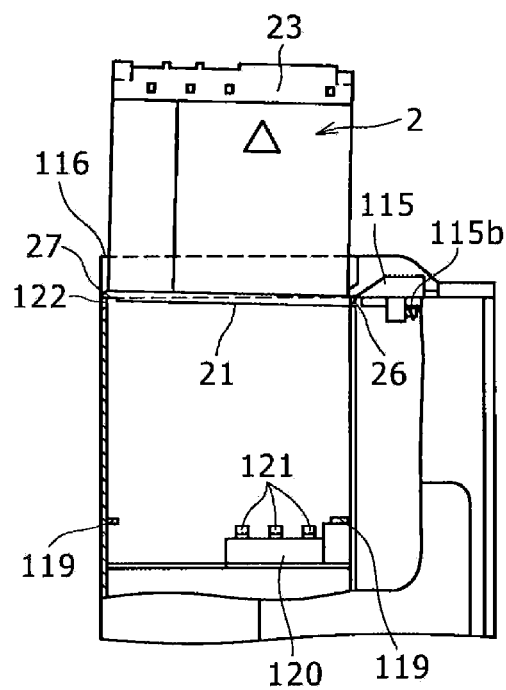

Furthermore, if the battery 2 is inserted in reverse depthwise orientation into the image pickup apparatus 1 as seen in FIG. 12D, then the projecting portions 26 and 27 of the battery 2 touch with edge portions of the opening 118 of the image pickup apparatus 1 and the battery 2 cannot be inserted into the image pickup apparatus 1. Therefore, the locking pawl 115 cannot lock the battery 2 and the lid 116 cannot close up the opening 118.

As described above, according to the battery 2, erroneous insertion into the image pickup apparatus 1 is prevented, and damage to the terminals 121 of the image pickup apparatus 1 by erroneous insertion of the battery 2 can be prevented.

Now, insertion operation of the battery 2A is described with reference to FIGS. 13 and 14.

As shown in FIG. 13, the battery 2A is inserted into the image pickup apparatus 1 while the face of the battery 2A (FIG. 3) which has the terminal windows 233 is directed toward the opening 118 of the image pickup apparatus 1 in a state wherein the locking pawl 115 is drawn closer by a finger. Then, if the locking pawl 115 is released from the finger at a point of time at which the bottom portion of the recessed portions 230 of the battery 2A contacts with the ribs 119 in the image pickup apparatus 1 and the battery 2A is accommodated fully into the image pickup apparatus 1 as shown in FIG. 14A, then the locking pawl 115 is biased by the spring 115b to slidably move on the locked face 271 in the direction toward the battery 2 until the locking pawl 115 locks the locked face 271 thereby to the lock the battery 2A. Thereafter, the lid 116 is closed so that the battery 2A is enclosed in the image pickup apparatus 1. At this time, the terminals 121 provided on the terminal plate 120 of the image pickup apparatus 1 are placed into a state electrically connected to the terminal contacting portions 222 of the battery 2A in a state wherein they are contracted by resilient deformation.

On the other hand, if the battery 2A is inserted in vertically inverted orientation into the image pickup apparatus 1 as shown in FIG. 14B, then the projecting portions 28 and 29 of the battery 2A touch with the ribs 119. At this time, since part of the battery 2A protrudes from the body of the image pickup apparatus 1, the locking pawl 115 cannot lock the battery 2A and the lid 116 cannot close up the opening 118. Further, the distance between the cap member 23 of the battery 2A and the ribs 119 of the image pickup apparatus 1 side is kept at a distance with which they do not contact with each other.

Further, if the battery 2A is inserted in erroneous transverse orientation into the image pickup apparatus 1 as shown in FIG. 14C, the projecting portion 28 of the battery 2A touches with an edge portion of the opening 118 of the image pickup apparatus 1 and the battery 2A cannot be inserted into the image pickup apparatus 1. Therefore, the locking pawl 115 cannot lock the battery 2 and the lid 116 cannot close up the opening 118.

Accordingly, with the battery 2A, erroneous insertion into the image pickup apparatus 1 can be prevented and damage to the terminals 121 of the image pickup apparatus 1 by erroneous insertion of the battery 2A can be prevented.

Further, also with the battery 2B shown in FIG. 4, erroneous installation into the image pickup apparatus 1 can be prevented.

In particular, if the battery 2 is erroneously inserted into the image pickup apparatus 1 similarly as in the situation illustrated in FIG. 12B, then the projecting portion 27 of the battery 2B touches with a rib 119 in the image pickup apparatus 1 and the side face of the cap member 23 abuts with another rib 119. At this time, since part of the battery 2B protrudes from the body of the image pickup apparatus 1, the locking pawl 115 cannot lock the battery 2B and the lid 116 cannot close up the opening 118. Further if the battery 2B is inserted in erroneous depthwise orientation into the image pickup apparatus 1, then the projecting portion 27 of the battery 2B touches with an edge portion of the opening 118 of the image pickup apparatus 1 and the battery 2B cannot be inserted into the image pickup apparatus 1. Consequently, the locking pawl 115 cannot lock the battery 2B and the lid 116 cannot close up the opening 118.

In this manner, also with the battery 2B, erroneous installation into the image pickup apparatus 1 can be prevented. It is to be noted that, also with the battery 2B, projecting portions 28 and 29 may be provided on the cap member 23 similarly as in the case of the battery 2A so that erroneous vertical installation and erroneous transverse installation are prevented.

Also with the battery 2C shown in FIG. 5, erroneous installation into the image pickup apparatus 1 can be prevented. In particular, if the battery 2B is inserted erroneous transverse orientation into the image pickup apparatus 1 similarly as in the situation shown in FIG. 12A, then the projecting portion 26 of the battery 2C touches with a rib 119 in the image pickup device 1 and the side face of the cap member 23 abuts with another rib 119. At this time, since part of the battery 2C protrudes from the body of the image pickup apparatus 1, the locking pawl 115 cannot be lock the battery 2C and the lid 116 cannot close up the opening 118. Further, if the battery 2C is inserted in erroneous depthwise orientation into the image pickup apparatus 1 similarly as in the situation shown in FIG. 12D, then the projecting portion 26 of the battery 2C touches with an edge portion of the opening 118 of the image pickup apparatus 1 and the battery 2C cannot be inserted into the image pickup apparatus 1. Consequently, the locking pawl 115 cannot lock the battery 2C and the lid 116 cannot close up the opening 118.

In this manner, also with the battery 2C, erroneous installation into the image pickup apparatus 1 can be prevented. It is to be noted that, also in the battery 2C, projecting portions 28 and 29 may be provided on the cap member 23 as in the case of the battery 2A so that erroneous vertical installation and erroneous transverse installation into the image pickup apparatus 1 can be prevented.

While the batteries described above are applied to the image pickup apparatus 1, the application of the battery according to the present invention is not limited to the image pickup apparatus, but the battery can be applied also to electronic apparatus which requires a battery.

Now, a charging apparatus for a battery according to the present invention is described.

Figure 16A:
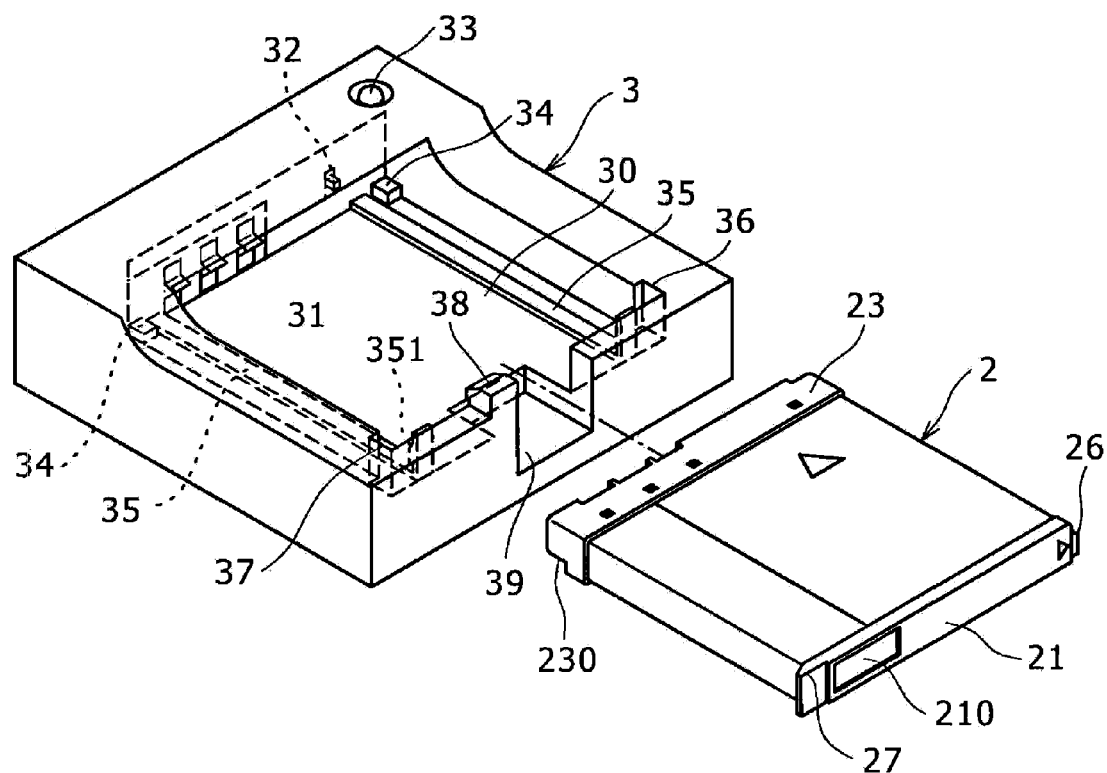
FIG. 16A is a perspective view showing a charging apparatus according to an embodiment of the present invention.
Figure 16B:
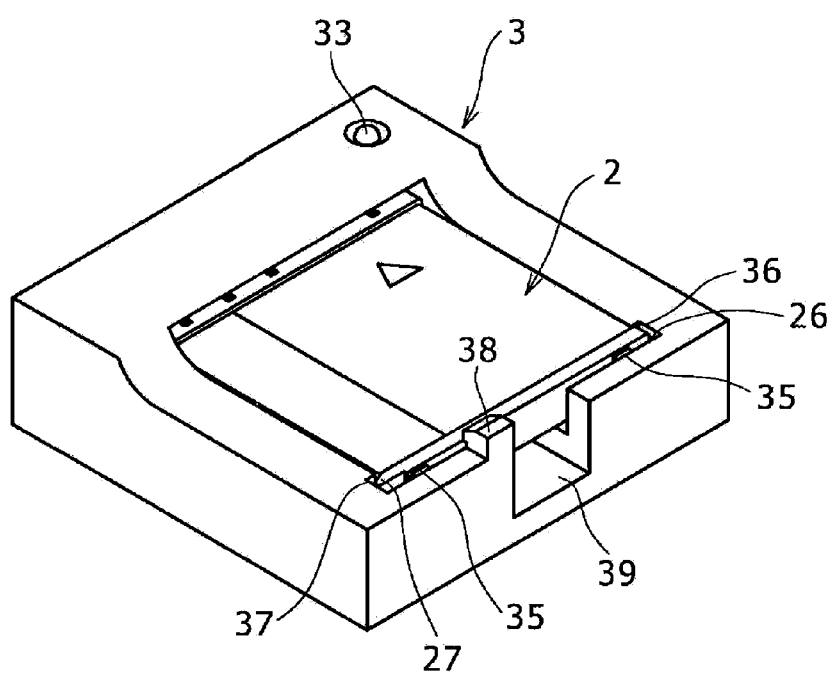
FIG. 16B is a perspective view illustrating a state wherein a battery having projecting portions at the opposite ends thereof is installed in the charging apparatus of FIG. 16A.
Figure 17A:
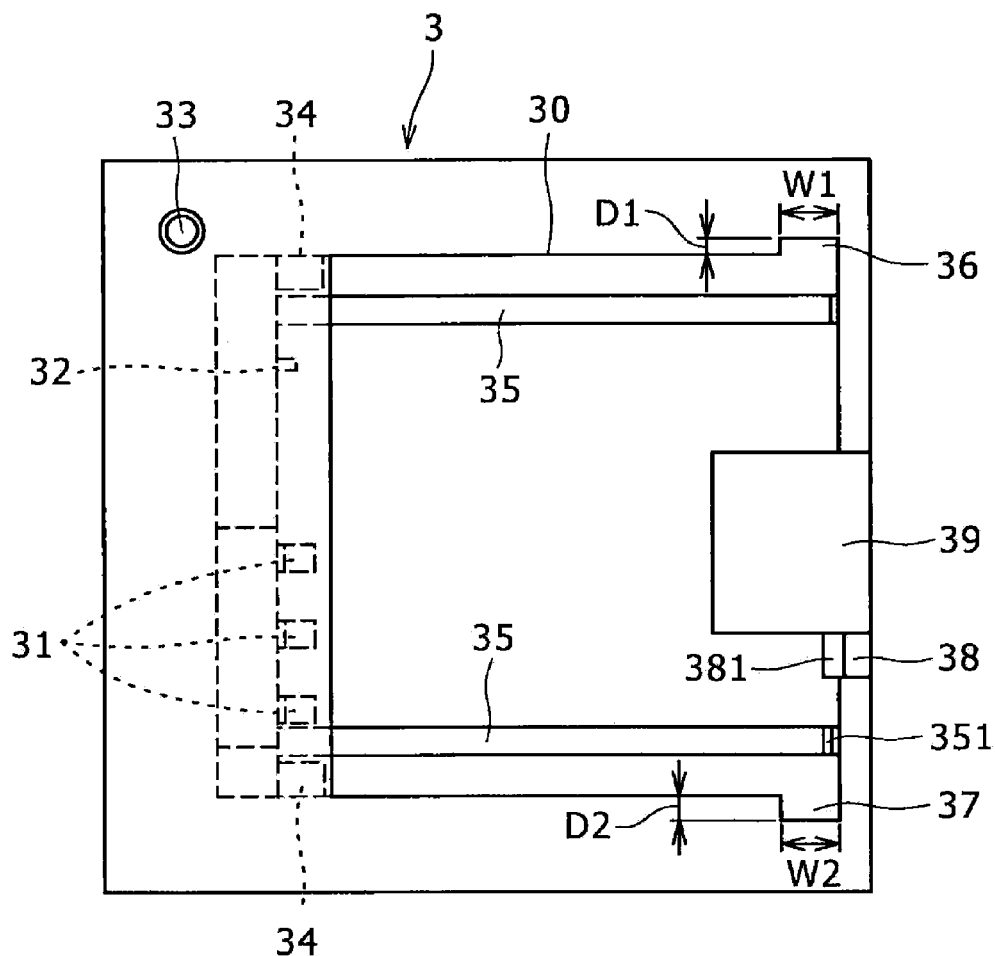
FIG. 17A is a plan view showing the embodiment of the charging apparatus of FIG. 16A.
Figure 17B:
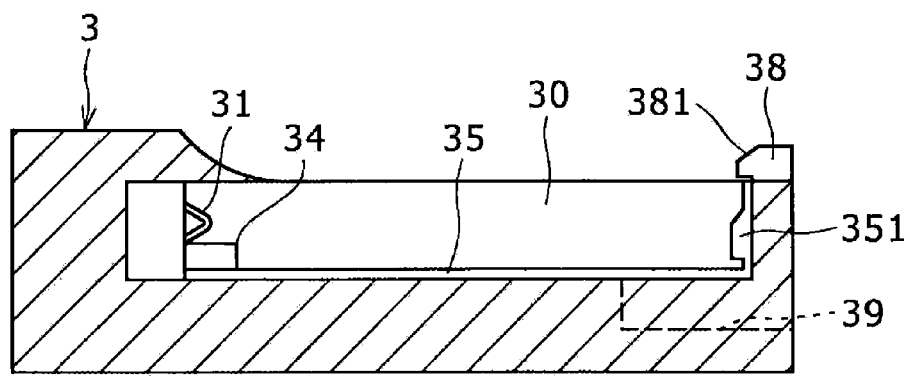
FIG. 17B is a sectional view showing the embodiment of the charging apparatus of FIG. 16A.
Figure 18A:
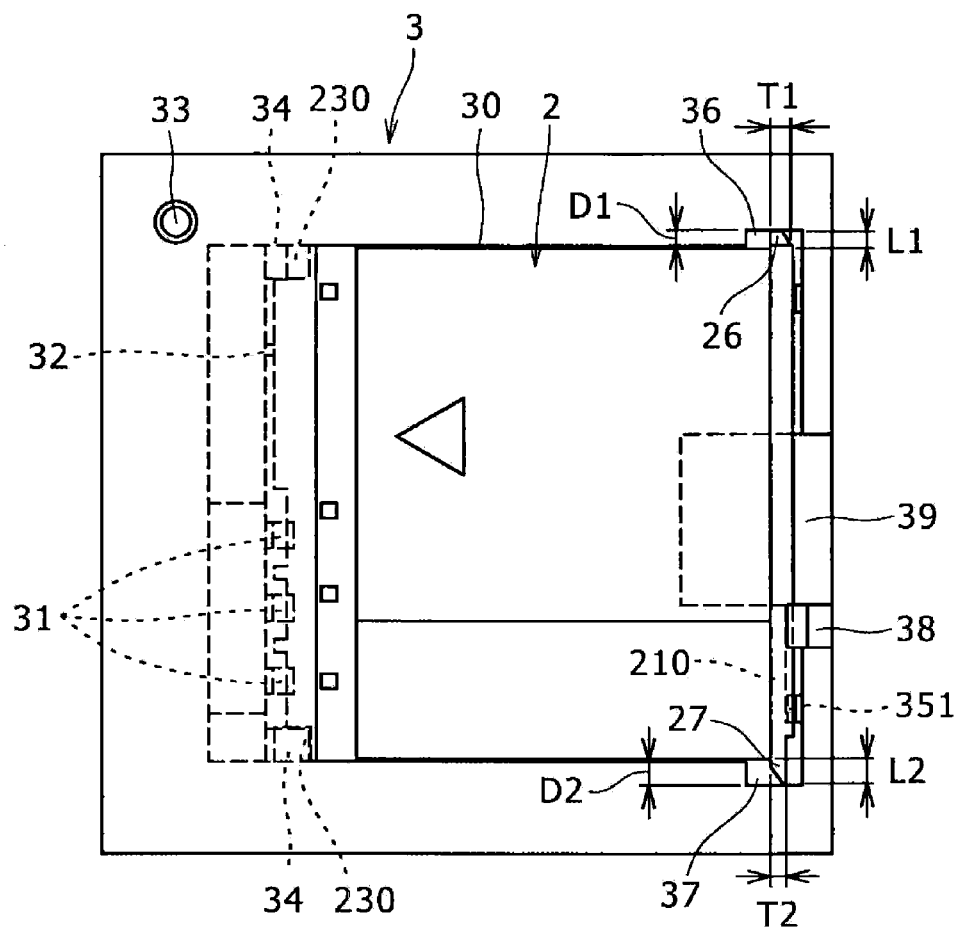
FIG. 18A is a plan view illustrating a state wherein a battery having projecting portions at the opposite ends thereof is installed in the charging apparatus of FIG. 16A.
Figure 18B:
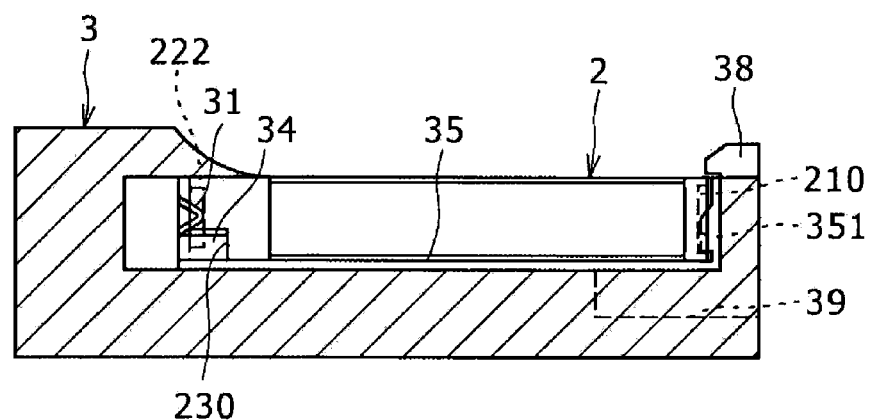
FIG. 18B is a sectional view illustrating a state wherein a battery having projecting portions at the opposite ends thereof is installed in the charging apparatus of FIG. 16A.
Figure 19:
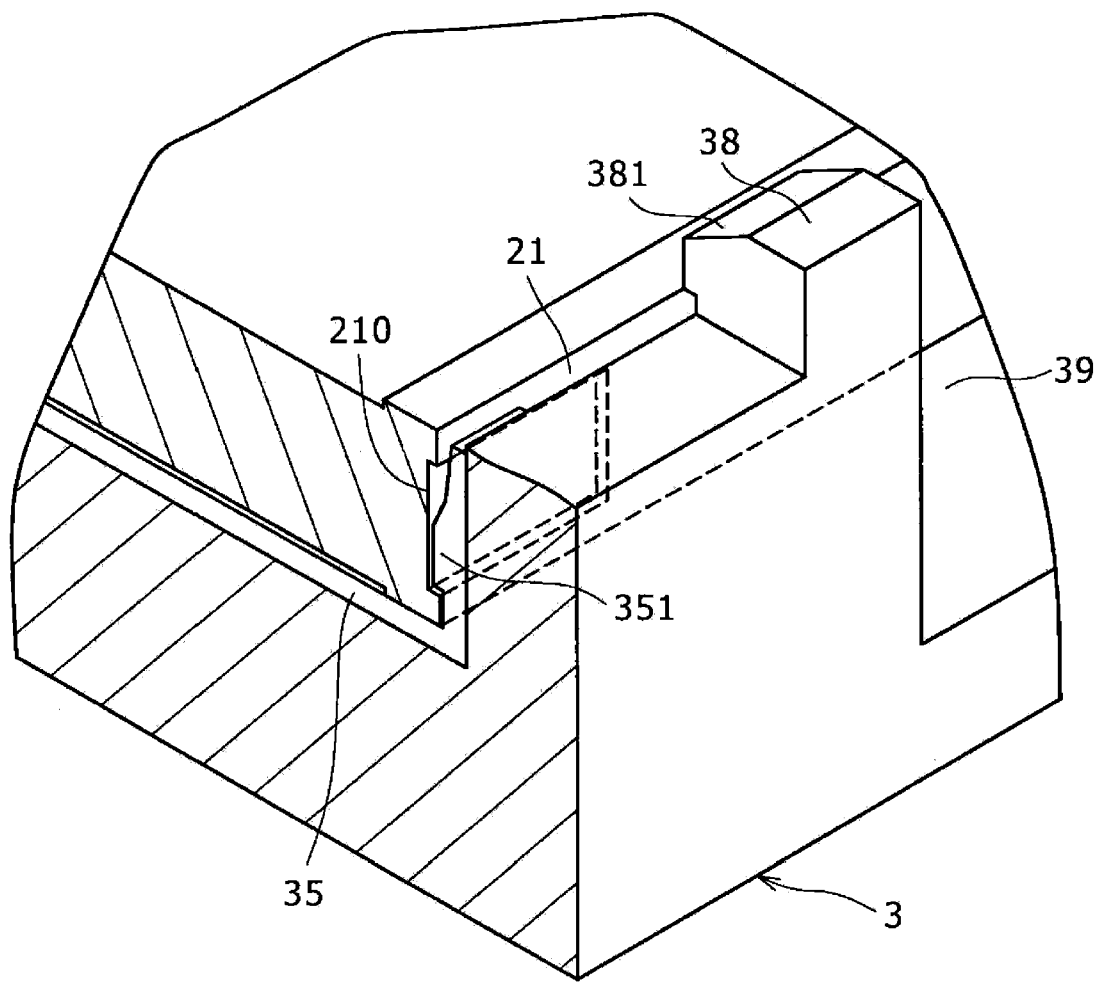
FIG. 19 is an enlarged view showing neighboring portions of a locking mechanism of the charging apparatus in which a battery is installed.

FIG. 16A is a perspective view showing an embodiment of a charging apparatus according to the present invention. FIG. 16B is a perspective view illustrating a state wherein a battery is installed in the charging apparatus. FIGS. 17A and 17B are a plan view and a sectional view, respectively, showing of the charging apparatus according to the present embodiment. FIGS. 18A and 18B are a plan view and a sectional view, respectively, illustrating a state wherein a battery is installed in the charging apparatus.

The charging apparatus 3 is a charging apparatus for the battery 2 and has an accommodating section 30 formed thereon for accommodating the battery 2. The accommodating section 30 includes charging terminals 31 on an inner side face thereof. The charging terminals 31 electrically connect to the terminal contacting portions 222 of the battery 2 as shown in FIG. 18B when the battery 2 is accommodated in the accommodating section 30 as shown in FIG. 16B. The charging terminals 31 have spring resiliency. Further, a switch 32 is provided on the inner side face described above. The switch 32 is a switch for a charge lamp 33 provided on the charging apparatus 3, and for example, the charge lamp 33 is lit or blinked upon charging of the battery 2, but upon completion of charging, the charge lamp 33 is turned off or is lit but in a color different from that upon lighting or blinking. It is to be noted that, though not shown, the battery 2 includes a plug for establishing connection to an AC-DC converter and an ac power supply. The plug may be removably mounted.

Further, ribs 34 are provided at corner portions of the accommodating section 30 on the side face side on which the charging terminals 31 are provided such that they contact with the recessed portions 230 formed on the cap member 23 of the battery 2 when the battery 2 is accommodated into the accommodating section 30. It is to be noted that, where the battery 2A is to be accommodated, accommodating sections for accommodating the projecting portions 28 and 29 of the battery 2A are provided on the side faces side on which the charging terminals 31 are provided.

Further, the accommodating section 30 includes projection accommodating portions for individually accommodating the projecting portions 26 and 27 formed on the frame member 21 of the battery 2. In the present embodiment, the accommodating section 30 includes a projection accommodating portion 36 for accommodating the projecting portion 26 and a projection accommodating portion 37 for accommodating the projecting portion 27.

The charging apparatus 3 has a structure wherein the battery 2 accommodated in the accommodating section 30 cannot be removed readily while the battery 2 accommodated in the accommodating section 30 can be taken out readily by hand. In particular, as shown in FIGS. 17A and 17B, the opening area of the accommodating section 30 is set smaller than the area of the bottom face portion of the accommodating section 30. On the other hand, a cutaway portion 39 into which a finger is inserted upon insertion and removal of the battery 2 is formed at an edge portion of the accommodating section 30 opposing to the charging terminals 31. The cutaway portion 39 is formed by cutting away part of a side face and an adjacent bottom face of the accommodating section 30 opposing to the charging terminals 31.

Further, two ribs 35 for stably receiving the battery 2 upon accommodation of the battery 2 are provided on the side face portion within the accommodating section 30 opposing to the charging terminals 31 and the bottom face portion of the accommodating section 30. Further, a locking portion 351 formed in a projecting shape is provided on one of the ribs 35 which is on the side face portion. The locking portion 351 locks the locked portion 210 formed in a recessed fashion on the frame member 21 of the battery 2 when the battery 2 is accommodated in the accommodating section 30. The locking portion 351 may be provided on both of the ribs 35.

Further, if a locking member 38 for locking the battery 2 is provided suitably at an end portion of the accommodating section 30 opposing to the side face which has the charging terminals 31 as shown in FIGS. 17B and 18B, then the locking portion 351 is fitted into the locked portion 210 formed on the frame member 21 of the battery 2 to lock the locked portion 210 and the locking member 38 locks the frame member 21 of the battery 2. Therefore, the battery 2 can be held with certainly in the charging apparatus 3. An inclined face 381 for allowing the body of the battery 2 to slide thereon when the battery 2 is to be inserted into the accommodating section 30 may be provided suitably on the locking member 38.

Now, the structure of the projection accommodating portions 36 and 37 is described with reference to FIGS. 17A and 18A.

The size of the projection accommodating portion 36 depends upon the shape of the projecting portion 26 and the projecting portion 27 formed on the battery 2. In particular, the width W1 of the projection accommodating portion 36 is set greater than the maximum thickness T1 of the projecting portion 26. Meanwhile, the width W1 is set suitably taking easy taking out of the battery 2 accommodated in the accommodating section 30 into consideration. The depth D1 of the projection accommodating portion 36 is set greater than the length L1 of the projecting portion 26 but smaller than the length L2 of the projecting portion 27.

The size of the projection accommodating portion 37 depends upon the shape of the projecting portion 27 formed on the battery 2. In particular, the width W2 of the projection accommodating portion 37 is set greater than the maximum thickness T2 of the projecting portion 27. Meanwhile, the width W2 is set suitably so that the battery 2 accommodated in the accommodating section 30 can be taken out readily. The depth D2 of the projection accommodating portion 37 is set greater than the length L2 of the projecting portion 27.

Since the size of the projection accommodating portions 36 and 37 is set based on the shape of the projecting portions 26 and 27 formed on the battery 2 as described above, the insertion direction of the battery 2 into the charging apparatus 3 is definite, and erroneous installation of the battery 2 into the charging apparatus 3 is prevented.

In particular, if the battery 2 is introduced into the accommodating section 30 with the cap member 23 of the battery 2 directed toward the charging terminals 31 of the charging apparatus 3, then the projecting portion 26 of the battery 2 is accommodated into the projection accommodating portion 36 and the projecting portion 27 is accommodated into the projection accommodating portion 37. Then, if the terminal contacting portions 222 of the battery 2 is brought into contact with the charging terminals 31, then the battery 2 is biased toward the side face on the locking portion 351 side by the resilient force of the charging terminals 31. At this time, the locking portion 351 of the charging apparatus 3 is engaged with the locked portion 210 of the battery 2. Then, if the battery 2 is displaced to the charging terminals 31 side when the battery 2 is to be taken out from the accommodating section 30, then the charging terminals 31 are resiliently deformed to cancel the engagement described above. Consequently, the battery 2 can be taken out.

Figure 20A:
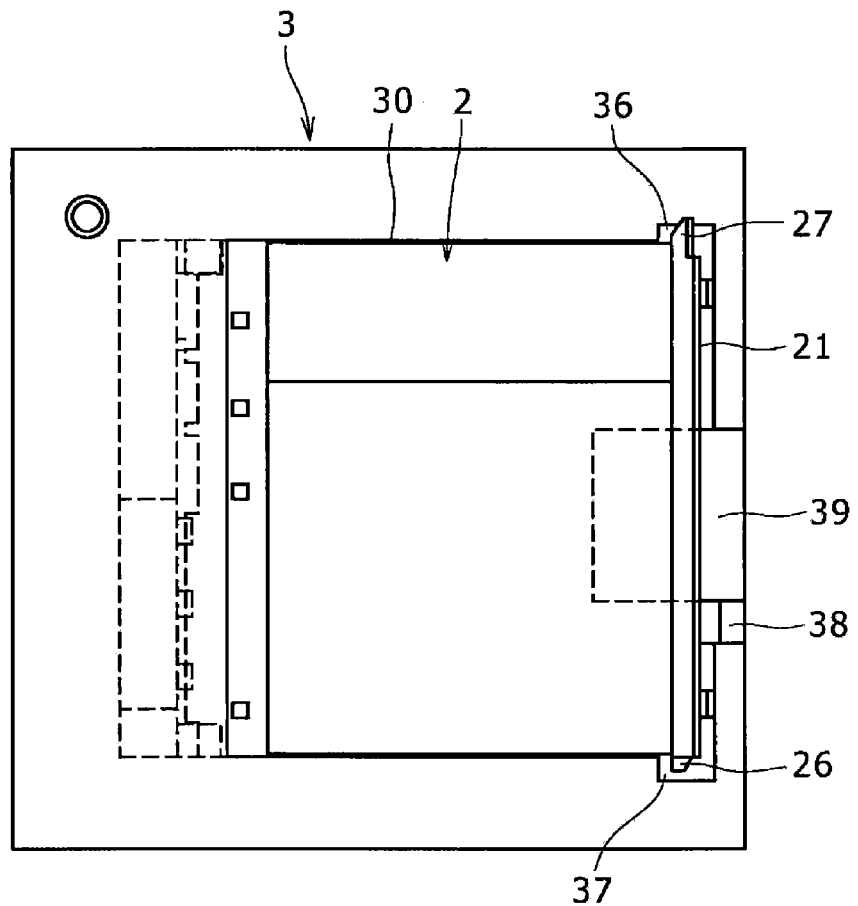
FIG. 20A is a plan view illustrating a state wherein a battery is inserted erroneously in vertically inverted orientation in the charging apparatus according to the present invention.
Figure 20B:
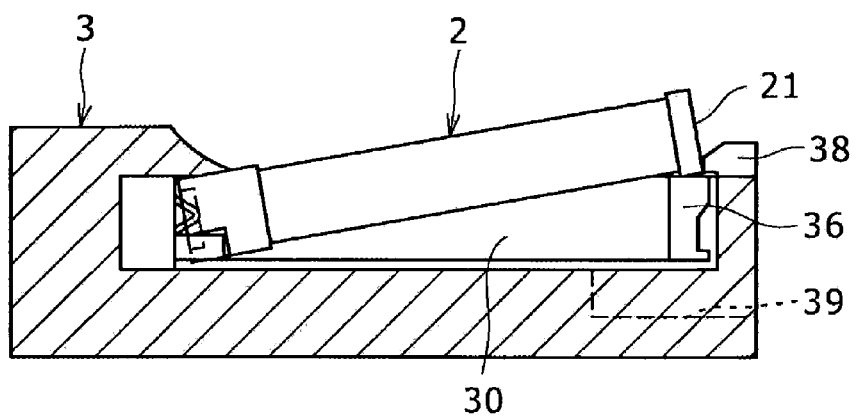
FIG. 20B is a sectional view illustrating the state wherein the battery is inserted erroneously in the vertically inverted orientation in the charging apparatus according to the present invention.

On the other hand, if the battery 2 is inserted in erroneous vertical orientation into the accommodating section 30 as seen in FIGS. 20A and 20B, then the projecting portion 27 formed on the frame member 21 of the battery 2 is brought into contact with an edge of the projection accommodating portion 36. Therefore, the battery 2 cannot be accommodated into the accommodating section 30. Consequently, installation of the battery 2 in erroneous vertical orientation into the charging apparatus 3 is prevented.

Figure 21A:
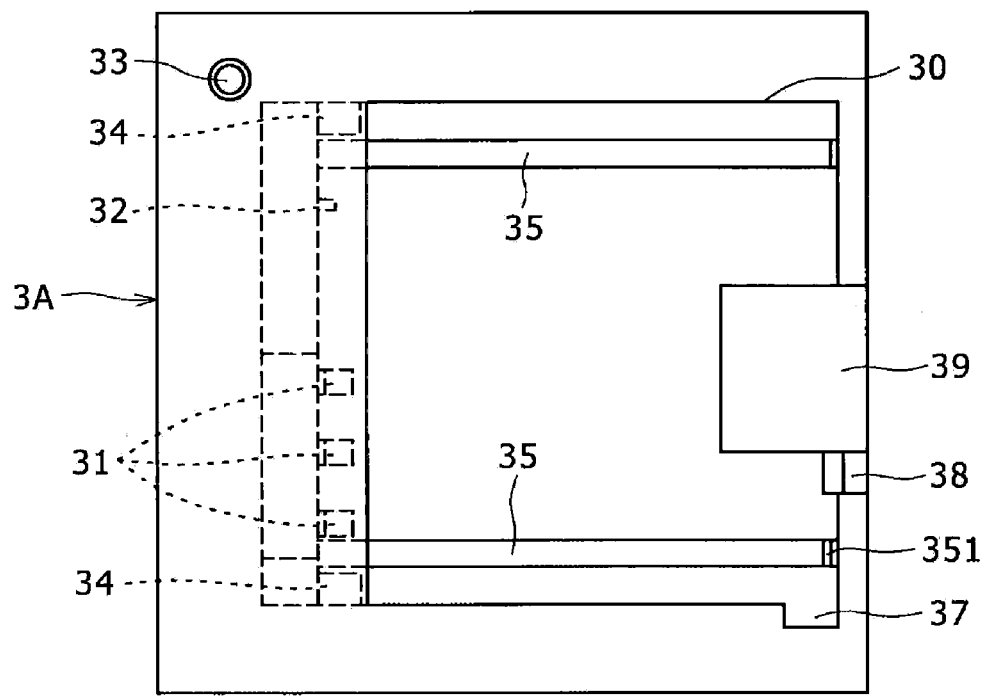
FIG. 21A is a plan view showing a charging apparatus according to another embodiment of the present invention.
Figure 21B:
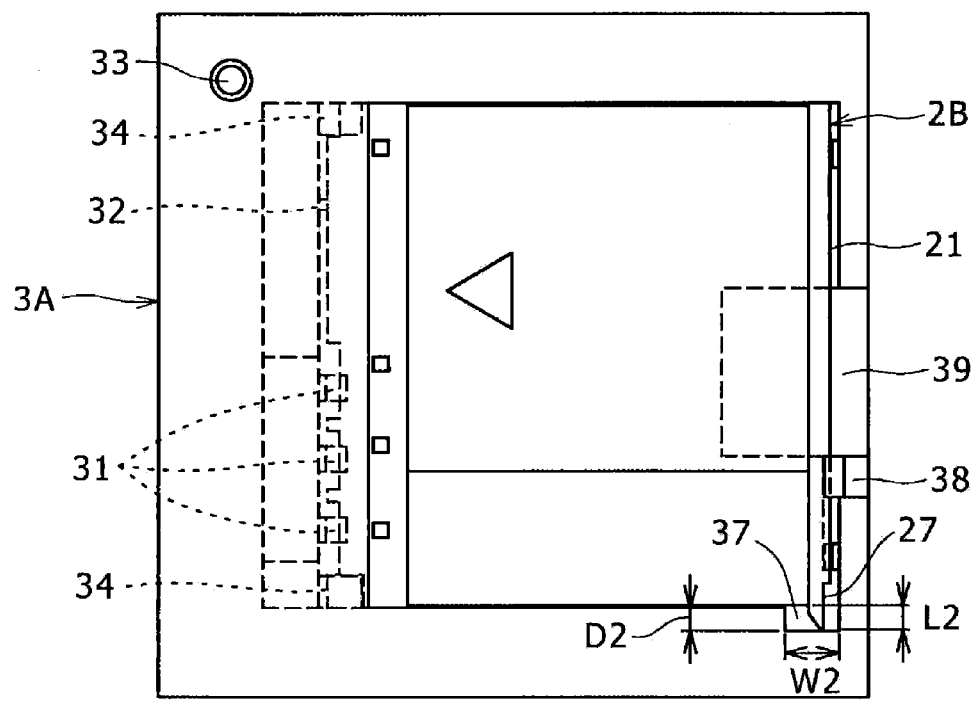
FIG. 21B is a plan view illustrating a state wherein a battery is installed in the charring apparatus of FIG. 21A.

FIG. 21A is a plan view showing an outline of a charging apparatus 3A for charging the battery 2B. FIG. 21B is a plan view showing a state wherein the battery 2B is installed in the charging apparatus 3A.

The charging apparatus 3A has a particular configuration same as that of the charging apparatus 3 except that only the projection accommodating portion 37 which can accommodate the projecting portion 27 of the battery 2B is provided on the accommodating section 30. In particular, the size of the projection accommodating portion 37 depends upon the shape of the projecting portion 27 formed on the battery 2B. In particular, the width W2 of the projection accommodating portion 37 is set greater than the maximum thickness T2 (FIG. 18A) of the projecting portion 27. The depth D2 of the projection accommodating portion 37 is set greater than the length L2 of the projecting portion 27. According to the charging apparatus 3A having such a configuration as just described, the insertion direction of the battery 2B into the charging apparatus 3 is definite, and it is apparent that erroneous installation of the battery 2B into the charging apparatus 3 is prevented.

Figure 22A:
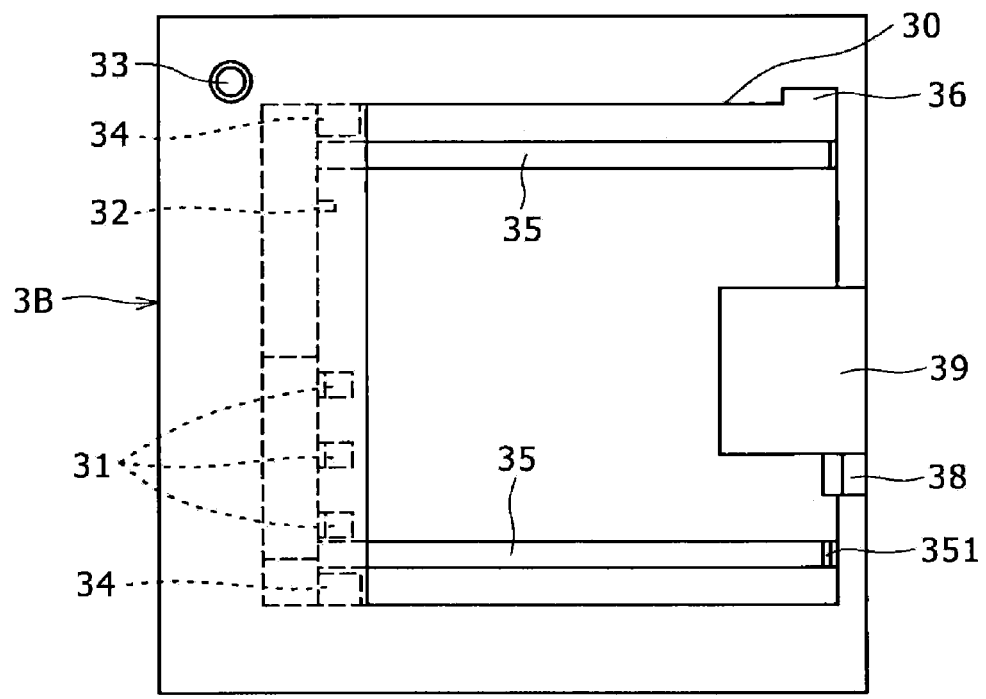
FIG. 22A is a plan view showing an embodiment of a charging apparatus according to a further embodiment of the present invention.
Figure 22B:
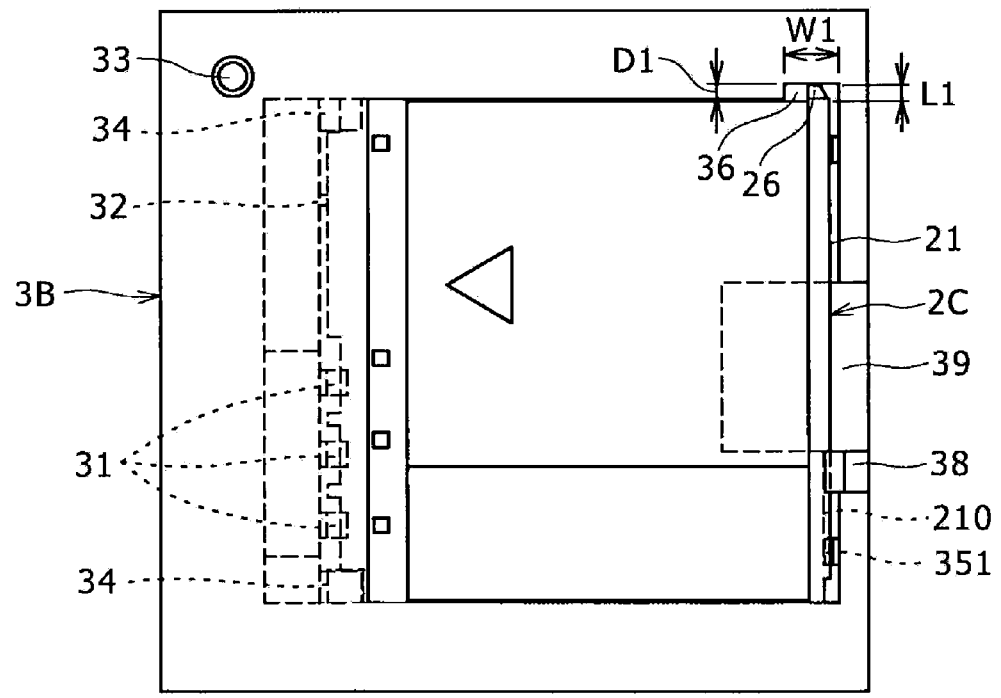
FIG. 22B is a sectional view illustrating a state wherein a battery is installed in the charring apparatus of FIG. 22A.

FIG. 22A is a plan view showing an outline of a charging apparatus 3B for charging the battery 2C. FIG. 22B is a plan view showing a state wherein the battery 2C is installed in the charging apparatus 3B.

The charging apparatus 3B has a particular configuration same as that of the charging apparatus 3 except that only the projection accommodating portion 36 which can accommodate the projecting portion 26 of the battery 2C is provided on the accommodating section 30. In particular, the size of the projection accommodating portion 36 depends upon the shape of the projecting portion 26 formed on the battery 2C. In particular, the width W1 of the projection accommodating portion 36 is set greater than the maximum thickness T1 (FIG. 18A) of the projecting portion 26. The depth D1 of the projection accommodating portion 36 is set greater than the length L1 of the projecting portion 26. According to the charging apparatus 3B having such a configuration as just described, the insertion direction of the battery 2C into the charging apparatus 3B is definite, and it is apparent that erroneous installation of the battery 2C into the charging apparatus 3B is prevented.

Figure 23:
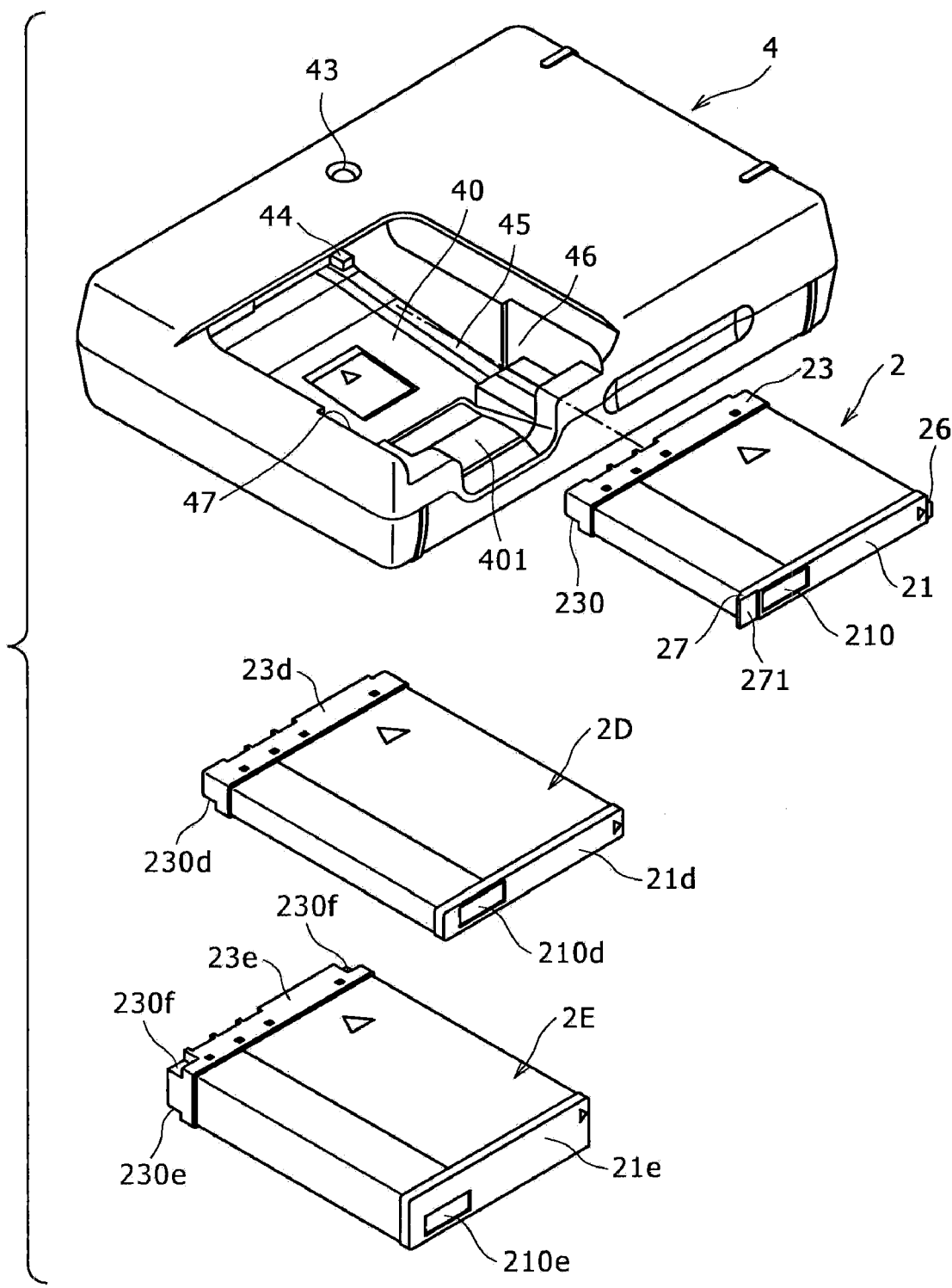
FIG. 23 is a perspective view showing a charging apparatus of a different embodiment of the present invention which can charge up the battery according to the present invention and a battery having principal faces of a rectangular shape.
Figure 24A:
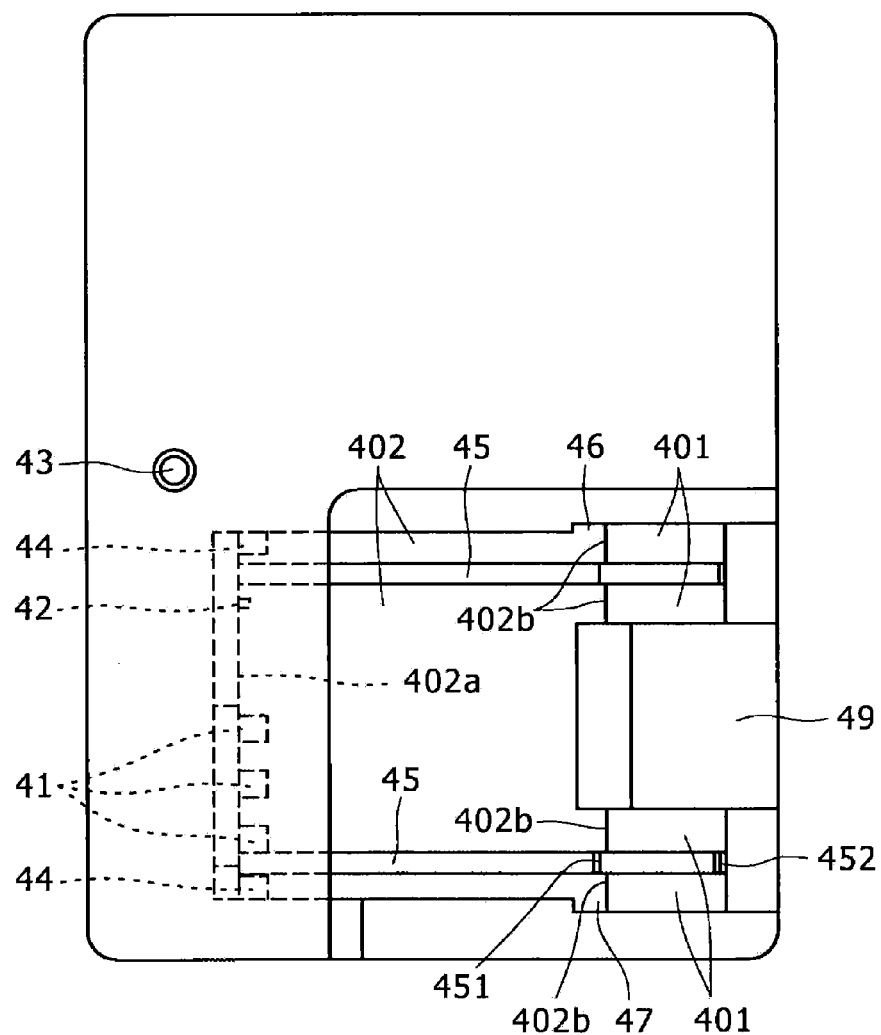
FIG. 24A is a front elevational view showing the charging apparatus according to the different embodiment of the present invention.
Figure 24B:
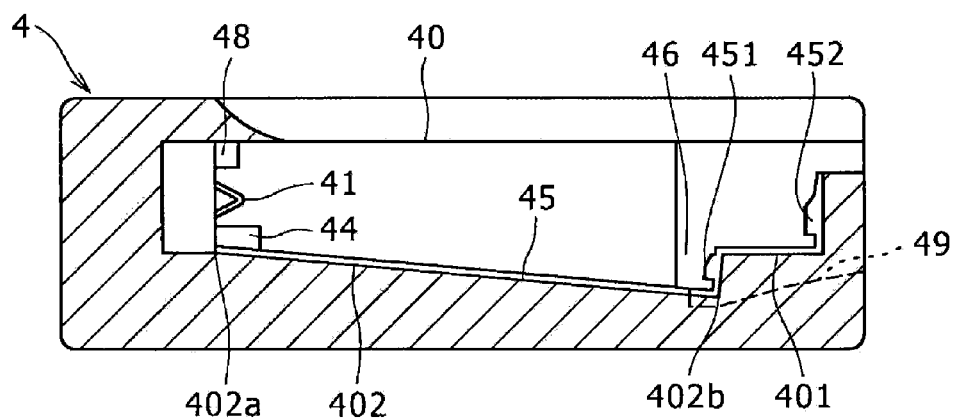
FIG. 24B is a sectional view showing the charging apparatus according to the different embodiment of the present invention.

Also FIG. 23 is an outer appearance view showing another embodiment of the charging apparatus according to the present invention. FIG. 24A is a plan view showing the charging apparatus. FIG. 24B is a sectional view showing the embodiment of the charging apparatus.

A conventional charging apparatus is formed as a charging apparatus for exclusive use based on the size and so forth of a battery. This is because the construction of charging terminal differs depending upon the battery size. Accordingly, where batteries of different sizes are to be charged by a single charging apparatus, the charging apparatus side must be provided with installation faces and charging terminals for exclusive use for the individual batteries and structures for securing the batteries. This not only increase the size of the charging apparatus but also increases the number of parts.

Therefore, a battery 43 is provided with a space for accommodating a battery wherein the principal face of a battery cell has a rectangular shape and another space for accommodating another battery wherein the principal face of a battery cell has a substantially square shape while charging terminals are provided commonly for the batteries so that the battery is charged through the charging terminals by the single charging apparatus of the present invention.

The charging apparatus 4 can charge not only the batteries 2 and 2A to 2C wherein the principal face of the battery cell has a substantially square shape but also batteries 2D and 2E wherein the principal face has a rectangular shape as in the structure of conventional batteries. As the battery 2D, a battery of the 3.5 V–2.4 Wh specifications is listed. As the battery 2E, a battery of the 3.6 V–4.4 Wh is listed. The battery 2D has a configuration same as that of the battery 2 shown in FIG. 2 except that the shape of the principal face of the battery cell is a rectangular shape. The battery 2E has a configuration same as that of the battery 2 shown in FIG. 2 except that the shape of the principal face of the battery cell is a rectangular shape and that the thickness of the battery cell is greater than the thickness of the battery 2.

The charging apparatus 4 has an accommodating section 40 formed thereon and having a space sufficient to accommodate the battery 2E having the greatest capacity from among at least the batteries 2, 2A to 2C, 2D and 2E.

Figure 25A:
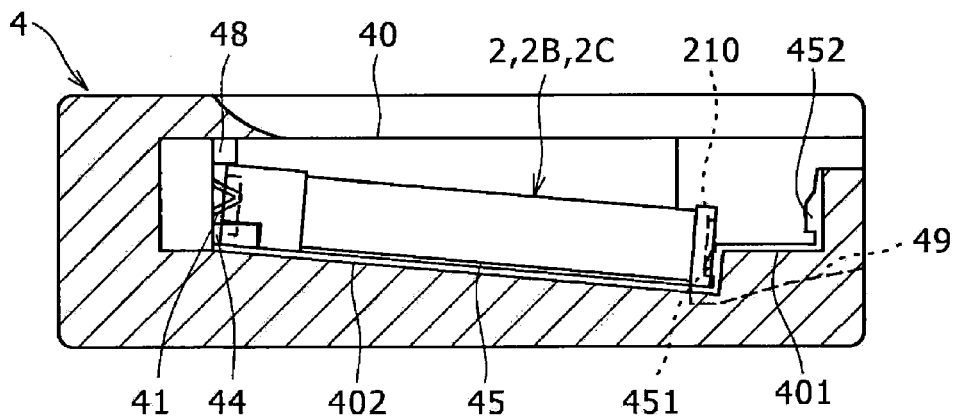
FIG. 25A is a sectional view illustrating a state wherein the battery according to the present invention is installed in the charging apparatus of FIG. 24A.
Figure 25B:
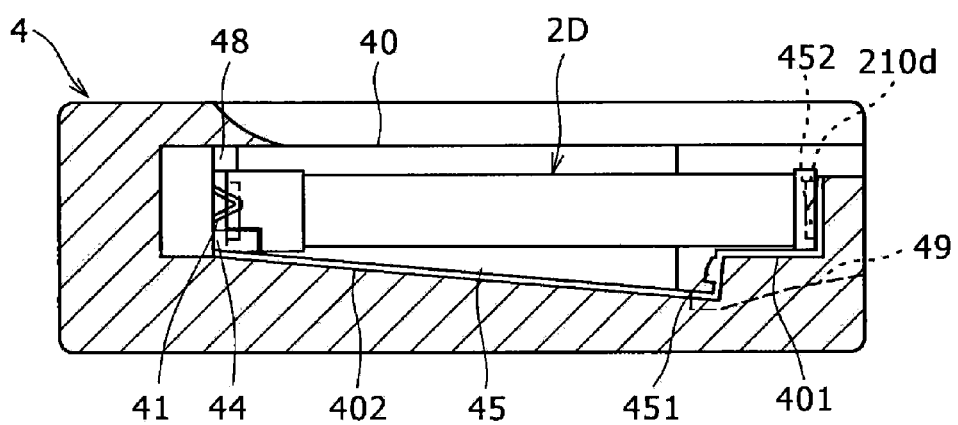
FIG. 25B is a sectional view illustrating a state wherein a battery having principal faces of a rectangular shape is installed in the charging apparatus according to the present invention.
Figure 25C:
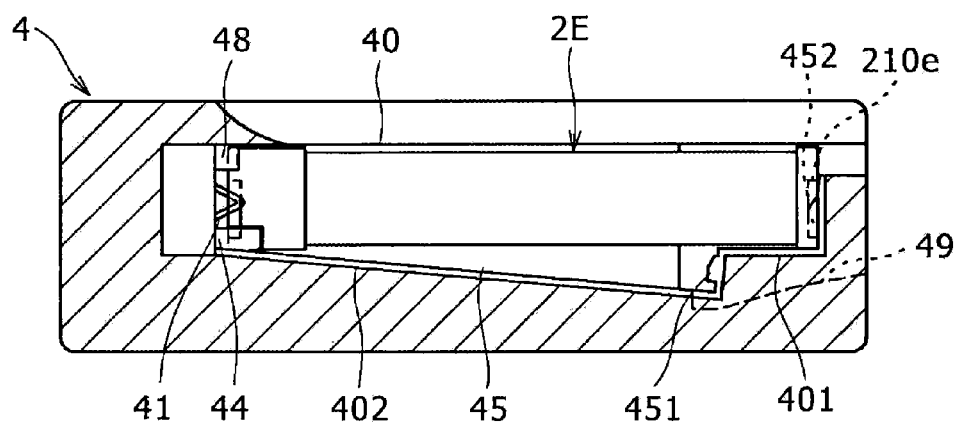
FIG. 25C is a sectional view illustrating a state wherein a battery having principal faces of a square shape and having a thickness greater than that of the battery of FIG. 25B which has rectangular principal faces is installed in the charging apparatus according to the present invention.

The accommodating section 40 includes charging terminals 41 provided on an inner side face thereof. The charging terminals 41 electrically connect to the terminal connection section of any of the batteries 2, 2B, 2C, 2D and 2E when the battery 2, 2B, 2C, 2D or 2E is accommodated in the accommodating section 40 as seen in FIGS. 25A to 25C. The charging terminals 41 have spring resiliency. Further, a switch 42 is provided on the inner side face described above. The switch 42 is a switch for a charge lamp 43 provided on the charging apparatus 4. For example, upon charging of any of the batteries 2, 2B, 2C, 2D and 2E, the charge lamp 43 is lit or blinked, but upon completion of charging, the charge lamp 43 is turned off or is lit but in a color different from that upon lighting or blinking during charging. It is to be noted that, though not shown, the charging apparatus 4 includes a plug for the connection to an ac power supply. The plug may be provided removably.

The accommodating section 40 has a first attachment face 401 to which the battery 2D or 2E is to be attached and a second attachment face 402 to which any of the batteries 2 and 2A to 2C is attached as seen in FIGS. 24A and 24B. The second attachment face 402 is set lower than the first attachment face 401 so that the batteries 2 and 2A to 2C can be selectively attached. The second attachment face 402 is configured such that the height of the side 402a on the charging terminals 41 side is set higher than the height of the side 402b on the first attachment face 401 side. In the present embodiment, the second attachment face 402 forms an inclined face to which any of the batteries 2 and 2A to 2C is to be attached by setting the height of the side 402a equal to the height of the first attachment face 401 while setting the height of the side 402b lower than the height of the first attachment face 401. By such a configuration as just described, batteries of different sizes can be installed without increasing the attachment faces for batteries. Besides, the charging terminals 41 can be used commonly irrespective of the size of the battery.

Also at corner portions of the accommodating section 40 on the face side on which the charging terminals 41 are provided, ribs 44 are provided for contacting with the recessed portions 230, 230d and 230e formed at the cap member of the battery when any of the batteries 2, 2B, 2C, 2D and 2E is accommodated in the accommodating section 40. Further, ribs 48 for contacting with recessed portions 230f formed on a frame member 23e of the battery 2E are provided on the accommodating section 40 as seen in FIG. 24B. It is to be noted that, where the battery 2A is to be accommodated, accommodating sections for accommodating the projecting portions 28 and 29 of the battery 2A are formed on the side face side on which the charging terminals 31 are provided.

Further, in the accommodating space whose bottom face is provided by the second attachment face 402, projection accommodation portions for accommodating the projecting portions 26 and 27 formed on the frame member 21 of the batteries 2 and 2A to 2C are provided. In the present embodiment, a projection accommodating portion 46 for accommodating the projecting portion 26 and a projection accommodating portion 47 for accommodating the projecting portion 27 are provided.

The charging apparatus 4 is structured such that the battery 2 accommodated in the accommodating section 40 cannot be removed readily whereas the battery 2 accommodated in the accommodating section 40 can be taken out readily by hand. In particular, as shown in FIGS. 24A and 24B, the opening area of the accommodating section 40 is set smaller than the area of the bottom face portion of the accommodating section 40. Meanwhile, a cutaway portion 49 into which a finger is to be inserted upon insertion and removal of any of the batteries 2 and 2A to 2E is formed on the edge portion of the accommodating section 40 opposing to the charging terminals 41. The cutaway portion 49 is formed by cutting away part of the side face of the accommodating section 40 opposing to the charging terminals 41 and the bottom face adjacent the side face.

Further, on the side face portion in the accommodating section 40 opposing to the charging terminals 41 and the bottom face portion of the accommodating section 40, two ribs 45 are provided for stably receiving any of the batteries 2 and 2A to 2E when the battery is accommodated in the accommodating section 40. Then, one of the ribs 45 on the side face portion includes locking portions 451 and 452 formed in a projecting manner. The locking portion 451 locks, when any of the batteries 2 and 2A to 2C is accommodated in the accommodating section 40, the locked portion 210 of the frame member 21 as seen in FIG. 25A. The locking portion 452 locks the locked portion 210d or 210e formed in a recessed fashion on the frame member 21 of the battery 2D or 2E as shown in FIGS. 25B and 25B when the battery 2D or 2E is accommodated in the accommodating section 40. The locking portions 451 and 452 may be provided on both of the ribs 45.

If locking means for locking the battery 2D or 2E is provided suitably at an edge portion of the accommodating section 40 opposing to the side face which has the charging terminals 41 similarly as in the charging apparatus 3 shown in FIGS. 17B and 18B, then the locking portion 452 is fitted into and locks the locked portion 210d or 210e formed on the frame member of the battery 2D or 2E and the locking means described hereinabove locks the locked portion 210d or 210e of the battery 2D or 2E. Accordingly, the battery 2D or 2E can be held with certainty in the charging apparatus 4.

Figure 26:
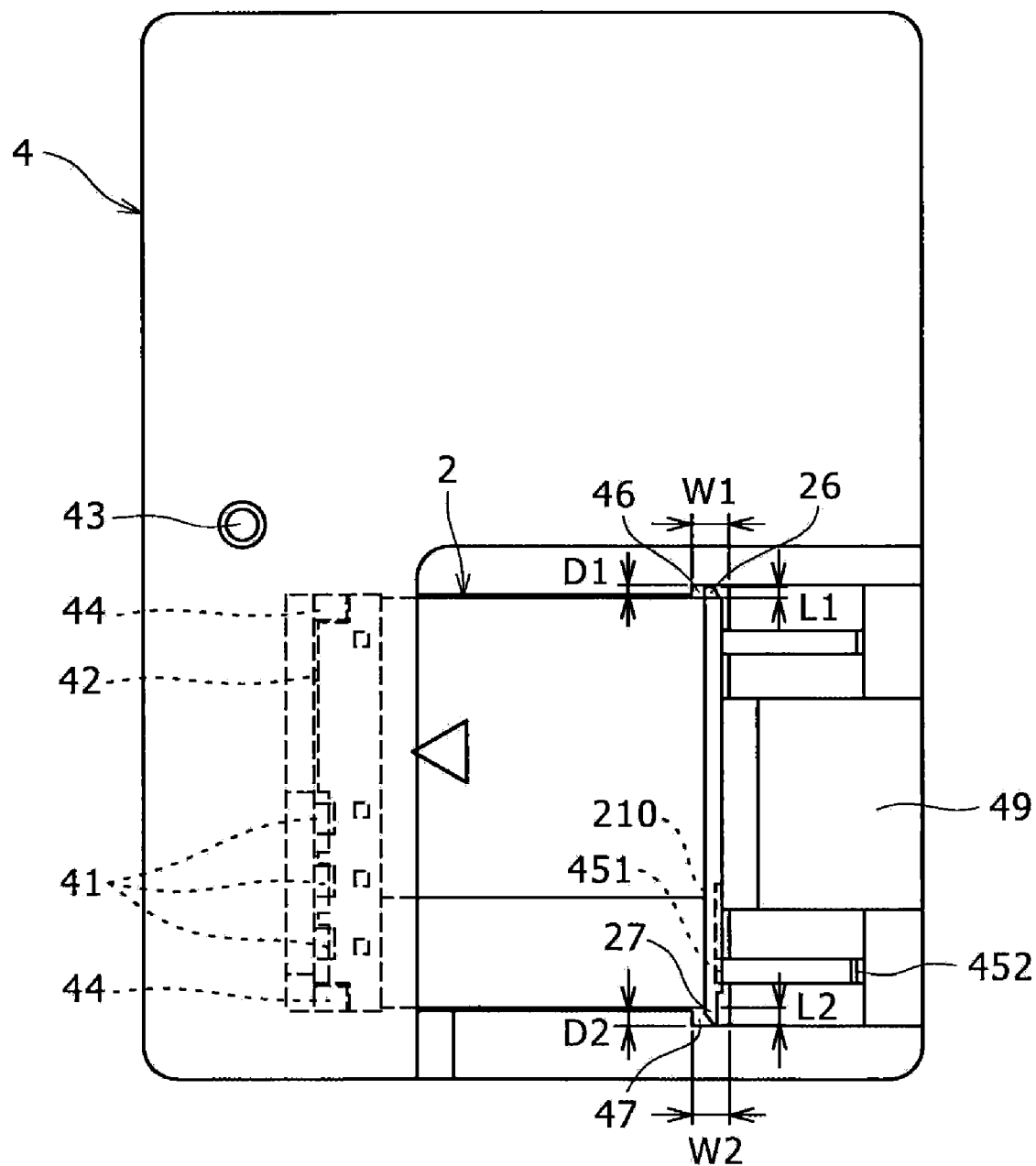
FIG. 26 is a plan view illustrating a state wherein the battery according the present invention having projecting portions at the opposite ends thereof is installed in the charging apparatus according to the present invention.

Now, the structure of the projection accommodating portions 46 and 47 is described with reference to FIG. 26.

The size of the projection accommodating portion 46 depends upon the shape of the projecting portion 26 and the projecting portion 27 formed on the batteries 2 and 2A to 2C. In particular, the width W1 of the projection accommodating portion 46 is set greater than the maximum thickness T1 (FIG. 18A) of the projecting portion 26. Further, the width W1 is set suitably taking also easy taking out of the battery accommodated in the accommodating section 30 into consideration. The depth D1 of the projection accommodating portion 46 is set greater than the length L1 (FIG. 18A) of the projecting portion 26 but smaller than the length L2 of the projecting portion 27.

The size of the projection accommodating portion 47 depends upon the shape of the projecting portion 27 formed on the batteries 2 and 2A to 2C. In particular, the width W2 of the projection accommodating portion 47 is set greater than the maximum thickness T2 (FIG. 18A) of the projecting portion 27. Further, the width W2 is set suitably taking also easy taking out of the battery 2 accommodated in the accommodating section 30 into consideration. The depth D2 of the projection accommodating portion 47 is set greater than the length L2 (FIG. 18A) of the projecting portion 27.

Since the size of the projection accommodating portions 46 and 47 is set based on the shape of the projecting portions 26 and 27 formed on the battery 2 in this manner, the insertion direction of the battery into the charging apparatus 4 is definite, and erroneous installation of the battery 2 into the charging apparatus 4 is prevented.

In particular, if the battery 2 is introduced into the accommodating section 40 with the cap member 23 of the battery 2 directed toward the charging terminals 41 of the charging apparatus 4, then the projecting portion 26 of the battery 2 is accommodated into the projection accommodating portion 46 and the projecting portion 27 is accommodated into the projection accommodating portion 47. Then, if the terminal contacting portions 222 of the battery 2 are brought into contact with the charging terminals 41, then the battery 2 is biased toward the side face on the locking portion 451 side by the resilient force of the charging terminals 41. At this time, the locking portion 451 of the charging apparatus 4 is engaged with the locked portion 210 of the battery 2. Then, when the battery 2 is to be removed from the accommodating section 40, if the battery 2 is displaced to the charging terminals 41 side, then the charging terminals 31 are resiliently deformed thereby to cancel the engagement described hereinabove. Consequently, the battery 2 can be removed.

On the other hand, if the battery is inserted in vertically inverted orientation into the accommodating section 40 similarly as in the situation illustrated in FIGS. 20A and 20B, then the projecting portion 27 formed on the frame member 21 of the battery is brought into contact with an edge of the projection accommodating portion 46. Consequently, the battery cannot be accommodated into the accommodating section 40. Therefore, erroneous installation of the batteries 2 and 2A to 2C in wrong vertical orientation into the charging apparatus 4 can be prevented.

Figure 27A:
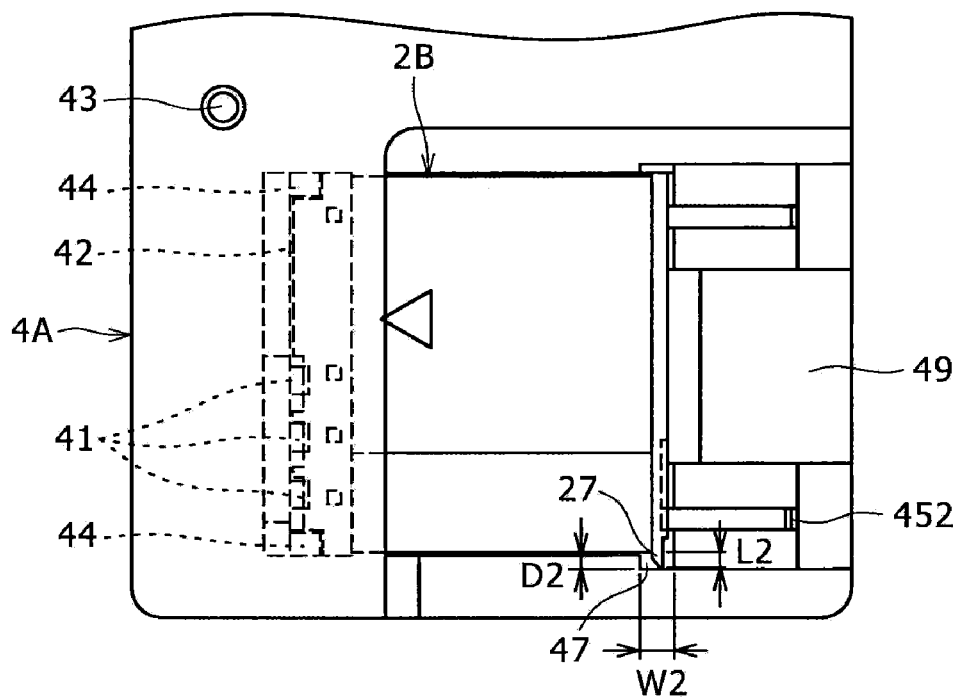
FIG. 27A is a plan view illustrating a state wherein the battery according the present invention having a projecting portion at one end thereof is installed in the charging apparatus according to the present invention.

FIG. 27A is a plan view showing a state wherein the battery 2B is installed in a charging apparatus 4A for charging the battery 2B.

The charging apparatus 4A has a particular configuration same as that of the charging apparatus 5 except that the accommodating section 40 includes only the projection accommodating portion 47 which can accommodate the projecting portion 27 of the battery 2B. In particular, the size of the projection accommodating portion depends upon the shape of the projecting portion 27 formed on the battery 2B. More particularly, the width W2 of the projection accommodating portion 47 is set greater than the maximum thickness T2 of the projecting portion 27. Further, the width W2 is set suitably taking also easy taking out of the battery 2 accommodated in the accommodating section 30 into consideration. The depth D2 of the projection accommodating portion 47 is set greater than the length L2 of the projecting portion 27. With the charging apparatus 4A having such a configuration as just described, the insertion direction of the battery 2B into the charging apparatus 4A is definite, and erroneous installation of the battery 2B into the charging apparatus 4A is prevented.

Figure 27B:
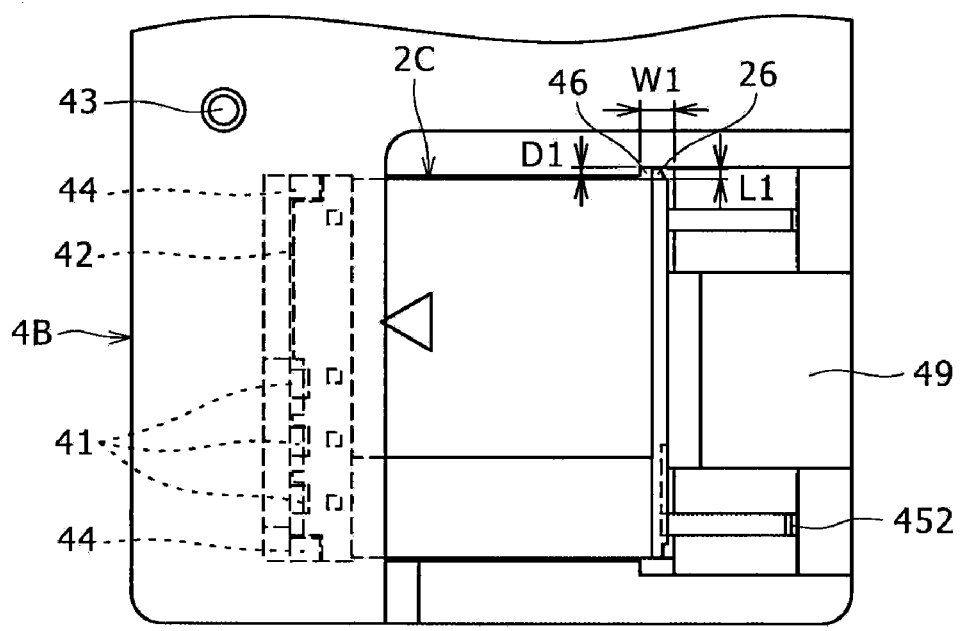
FIG. 27B is a plan view illustrating a state wherein the battery according the present invention having a projecting portion at another end thereof is installed in the charging apparatus according to the present invention.
Figure 28:
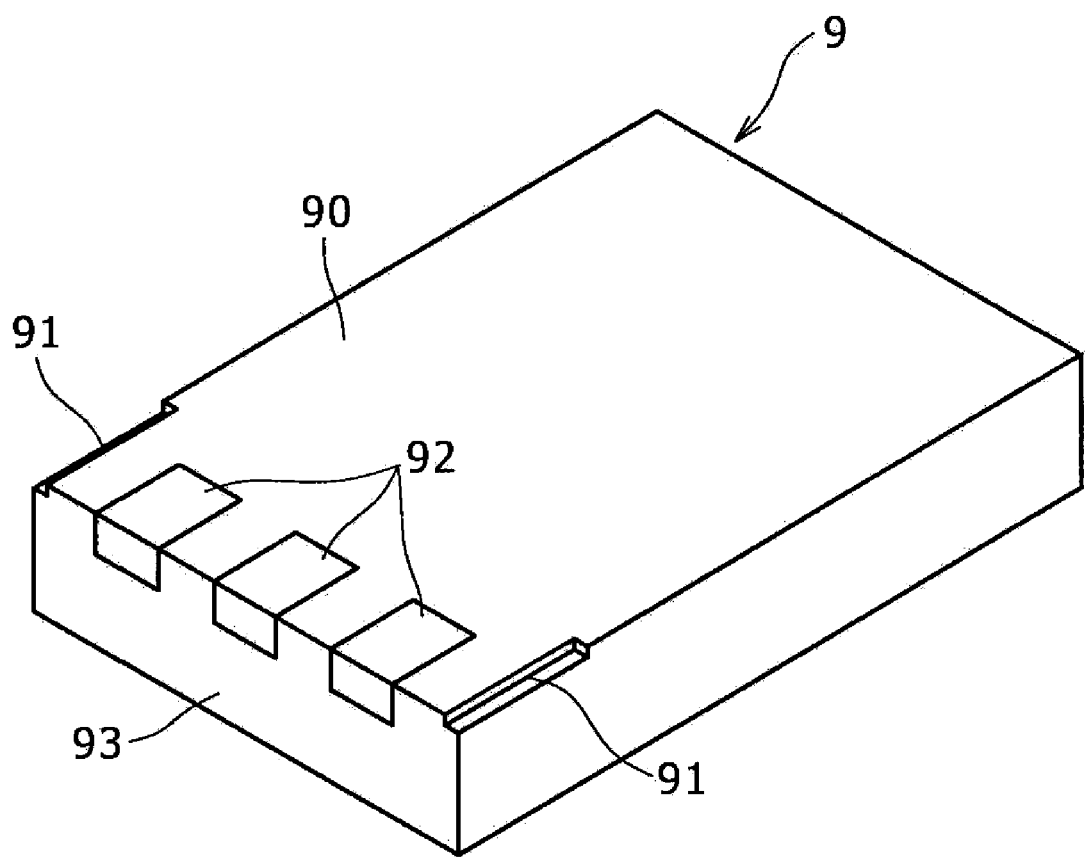
FIG. 28 is a perspective view showing a battery according to a conventional example.

FIG. 27B is a plan view showing a state wherein the battery 2C is installed in a charging apparatus 4B.

The charging apparatus 4B has a particular configuration same as that of the charging apparatus 4 except that the accommodating section 40 includes only the projection accommodating portion 46 which can accommodate the projecting portion 26 of the battery 2C. In particular, the size of the projection accommodating portion 46 depends upon the shape of the projecting portion 26 formed on the battery 2C. More particularly, the width W1 of the projection accommodating portion 46 is set greater than the maximum thickness T1 of the projecting portion 26. Further, the width W1 is set suitably taking also easy taking out of the battery 2 accommodated in the accommodating section 30 into consideration. The depth D1 of the projection accommodating portion 46 is set greater than the length L1 of the projecting portion 26. With the charging apparatus 4B having such a configuration as just described, the insertion direction of the battery 2C into the charging apparatus 4B is definite, and erroneous installation of the battery 2C into the charging apparatus 4B is prevented.

As described above, with the battery according to the present invention, since the insertion direction of the battery into an electronic apparatus or a charging apparatus is definite, it is apparent that erroneous installation of the battery 2C into the charging apparatus 4B is prevented.

In the charging apparatus according to the present invention, since a projection formed on a battery can be selectively accommodated, erroneous installation of the battery is prevented. Further, since spaces for storing batteries having different shapes are provided and charging terminals of the charging apparatus serve also as charging terminals for the batteries, batteries of different sizes can be charged with the single charging electrode.

In the electronic apparatus according to the present invention, since projecting portions formed on batteries can be selectively accommodated, erroneous installation of a battery is prevented.

The invention claimed is:

1. A battery, comprising:
   a battery cell formed in a flattened substantially parallelepiped shape;
   a connection terminal section electrically connected to the battery cell, the connection terminal section provided on a first face of said battery;
   recessed portions formed on the first face of the battery;
   a locked portion formed on a second face of the battery for locking the battery, the second face of the battery opposing the first face of the battery; and
   a locked face formed on an edge of the second face of the battery.

2. The battery of according to claim 1, further comprising:
   projecting portions projecting in a longitudinal direction from each of opposite ends of the second face of said battery,
   wherein the projecting portions have projecting lengths different from each other.

3. The battery according to claim 2, wherein the projecting portions have projecting thicknesses different from each other.

4. The battery according to claim 2, wherein the locked face is formed on one projecting portion.

5. The battery according to claim 1, further comprising:
   a substantially quadrilateral shape frame member for accommodating the battery cell.

6. The battery according to claim 5, wherein the locked portion is formed on the frame member.

7. The battery according to claim 5, further comprising:
   a film integrally covering the battery cell and the frame member.

8. The battery according to claim 5, further comprising:
   a cap member attached to one end side of the frame member through a circuit board member and configured to expose the connection terminal section.

9. The battery according to claim 8, wherein the recessed portions are formed on the cap member.

10. The battery according to claim 5, further comprising:
    a first protruding portion formed on a bottom portion of the frame member for supporting a bottom portion of the battery cell.

11. The battery according to claim 10, further comprising:
    a second protruding portion formed on an upper portion of the frame member, the second protruding portion opposing the first protruding portion.

12. The battery according to claim 8, further comprising:
    a plurality of terminal windows provided on an end face portion of the cap member,
    wherein the connection terminal section of the circuit board member is exposed through the plurality of terminal windows.

13. The battery according to claim 5, wherein the locked face has a height lower than a face of the frame member to indicate a location locked by a locking member.

14. The battery according to claim 2, wherein the projecting portions have a substantially trapezoidal cross section with an inclined face.

* * * * *